United States Patent
Paz et al.

(10) Patent No.: US 11,742,913 B2
(45) Date of Patent: Aug. 29, 2023

(54) INTRA SLOT ANTENNA DIVERSITY FOR UPLINK TRANSMISSIONS

(71) Applicant: QUALCOMM Incorporated, San Diego, CA (US)

(72) Inventors: Daniel Paz, Geva Carmel (IL); Michael Levitsky, Rhovot (IL); Assaf Touboul, Netanya (IL); Jacob Pick, Beit Zayit (IL)

(73) Assignee: QUALCOMM INCORPORATED, San Diego, CA (US)

( * ) Notice: Subject to any disclaimer, the term of this patent is extended or adjusted under 35 U.S.C. 154(b) by 0 days.

(21) Appl. No.: 17/645,022

(22) Filed: Dec. 17, 2021

(65) Prior Publication Data
US 2023/0198586 A1    Jun. 22, 2023

(51) Int. Cl.
*H04L 5/00*        (2006.01)
*H04B 7/06*        (2006.01)
*H04W 72/0446*    (2023.01)

(52) U.S. Cl.
CPC ......... *H04B 7/0608* (2013.01); *H04L 5/0048* (2013.01); *H04W 72/0446* (2013.01)

(58) Field of Classification Search
CPC ........... H04W 72/042; H04W 72/0446; H04W 72/0453; H04W 72/1289; H04W 72/0413; H04W 56/001; H04W 4/70; H04L 5/0023; H04L 5/0044; H04L 1/0625; H04L 27/2636; H04L 5/0048; H04L 5/0091; H04L 1/0003; H04L 27/2615; H04B 7/0695; H04B 7/0456; H04B 7/0404; H04B 7/0417; H04B 7/043; H04B 7/0615; H04B 1/713; H04B 7/0626; H01Q 9/0407; H01Q 1/1257; H01Q 13/10; H01Q 3/24; H01Q 15/006; H01Q 9/0442; H01Q 3/26
(Continued)

(56) References Cited

U.S. PATENT DOCUMENTS

2008/0198082 A1* 8/2008 Soler Castany ......... H01Q 1/38
                                                                  343/893
2010/0091641 A1* 4/2010 Gaal .................... H04B 7/0669
                                                              370/344
(Continued)

FOREIGN PATENT DOCUMENTS

WO    2021155505 A1    8/2021

OTHER PUBLICATIONS

International Search Report and Written Opinion—PCT/US2022/081279—ISA/EPO—dated Mar. 13, 2023.

*Primary Examiner* — Eva Y Puente
(74) *Attorney, Agent, or Firm* — Harrity & Harrity, LLP; Nerrie M. Zohn

(57) ABSTRACT

Aspects of the techniques and apparatuses described herein provide an intra slot antenna diversity scheme that a user equipment (UE) may use to transmit uplink communications while mitigating antenna imbalance. In an intra slot antenna diversity scheme, a UE transmits an uplink communication by transmitting a first portion of the uplink transmission in a first part of a slot using a first subset of antennas and a second portion of the uplink communication in a second part of the slot using a second subset of antennas. A decision to apply an intra slot antenna diversity scheme may be made by a network node such as a base station. Numerous other aspects are described.

30 Claims, 9 Drawing Sheets

(58) Field of Classification Search
USPC .......................................................... 375/329
See application file for complete search history.

(56) References Cited

U.S. PATENT DOCUMENTS

| | | |
|---|---|---|
| 2012/0076087 A1 | 3/2012 | Muquet et al. |
| 2017/0104549 A1* | 4/2017 | Wang .................. H04B 17/318 |
| 2018/0323932 A1* | 11/2018 | Huang .................. H04L 5/0012 |
| 2020/0022127 A1* | 1/2020 | Li ..................... H04W 72/0406 |
| 2020/0028638 A1 | 1/2020 | Liu et al. |
| 2021/0367727 A1 | 11/2021 | Go et al. |

* cited by examiner

INTRA SLOT ANTENNA DIVERSITY FOR UPLINK TRANSMISSIONS

FIELD OF THE DISCLOSURE

Aspects of the present disclosure generally relate to wireless communication and to techniques and apparatuses for intra slot antenna diversity for uplink transmissions.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. 5G, which may be referred to as New Radio (NR), is a set of enhancements to the LTE mobile standard promulgated by the 3GPP. 5G is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in 4G, 5G, and other radio access technologies remain useful.

SUMMARY

In uplink communication, there are typically more antennas in use on the receiver (base station) side than on transmitter (UE) side. As a result, the UE may perform transmission antenna diversity or transmission antenna selection techniques. UE antennas can suffer from a strong antenna imbalance (e.g., in frequency range 1 (FR1)) and port imbalance (e.g., in frequency range 2 (FR2)). In a cyclic delay diversity mode, a UE can simultaneously transmit on each of a subset of antennas of a set of UE uplink antennas using a cyclic delay to produce signals with different cyclic phase/delay on the different antennas. In an antenna switch diversity mode, the transmission can be switched between different antennas. Switching between cyclic delay diversity mode and the antenna switch diversity mode can be on a per-subframe or slot basis and based on various performance metrics (e.g., modulation and coding scheme (MCS), resource block (RB) allocation, and/or Doppler properties, among other examples).

In some cases, UEs can make antenna diversity selection and/or switching decisions with low periodicity to allow for obtaining sufficient measurements to facilitate a reliable antenna selection and/or switching decision and/or due to limitations of reference signal periodicity and/or availability in downlink. Thus, antenna selection and/or switching procedures can result in low responsiveness for different scenarios. As a result, tracking fast imbalance variations or fast antenna blockage events can be impossible due to the low rate of the selection and/or switching decisions. Furthermore, there can be a probability of mismatch in selection of the best antenna(s) (e.g., in case of low signal to noise ratio, limited bandwidth of reference signals for reference signal received power measurement, channel fading, and/or interference impacting the measurement, among other examples), and UEs can fail to properly select the best antenna(s) even for relatively static scenarios. In some cases in which frequency division duplex is used, antenna selection and/or switching schemes can be inapplicable due to the lack of channel reciprocity between downlink and uplink. Consequently, antenna diversity selection and/or switching schemes can provide limited solutions to mitigate antenna imbalance, thereby having a negative impact on network performance.

Some aspects of the techniques and apparatuses described herein provide an intra slot antenna diversity scheme that a UE may use to transmit uplink communications while mitigating antenna imbalance. In an intra slot antenna diversity scheme, a UE may transmit an uplink communication by transmitting a first portion of the uplink transmission in a first part of a slot using a first subset of antennas and a second portion of the uplink communication in a second part of the slot using a second subset of antennas. In some aspects, a decision to apply an intra slot antenna diversity scheme may be made by a network node such as a base station. In this way, an intra slot antenna diversity scheme may result in improved reliability and link efficiency. Thus, some aspects of the techniques described herein may positively impact network performance.

Some aspects described herein relate to a UE for wireless communication. The user equipment may include a memory and one or more processors coupled to the memory. The one or more processors may be configured to receive an intra slot antenna diversity mode configuration corresponding to an intra slot antenna diversity scheme for uplink transmissions. The one or more processors may be configured to transmit an uplink communication based at least in part on the intra slot antenna diversity scheme, wherein transmitting the uplink communication comprises transmitting a first portion of the uplink communication in a first part of a slot using a first subset of antennas of a set of antennas associated with the UE and transmitting a second portion of the uplink communication in a second part of the slot using a second subset of antennas of the set of antennas.

Some aspects described herein relate to a base station for wireless communication. The base station may include a memory and one or more processors coupled to the memory.

The one or more processors may be configured to transmit, to a UE, an intra slot antenna diversity mode configuration corresponding to an intra slot antenna diversity scheme for uplink transmissions. The one or more processors may be configured to receive, from the UE, an uplink communication based at least in part on the intra slot antenna diversity scheme, wherein receiving the uplink communication comprises receiving a first portion of the uplink communication in a first part of a slot using a first subset of antennas of a set of antennas associated with the UE and receiving a second portion of the uplink communication in a second part of the slot using a second subset of antennas of the set of antennas.

Some aspects described herein relate to a method of wireless communication performed by a UE. The method may include receiving an intra slot antenna diversity mode configuration corresponding to an intra slot antenna diversity scheme for uplink transmissions. The method may include transmitting an uplink communication based at least in part on the intra slot antenna diversity scheme, wherein transmitting the uplink communication comprises transmitting a first portion of the uplink communication in a first part of a slot using a first subset of antennas of a set of antennas associated with the UE and transmitting a second portion of the uplink communication in a second part of the slot using a second subset of antennas of the set of antennas.

Some aspects described herein relate to a method of wireless communication performed by a base station. The method may include transmitting, to a UE, an intra slot antenna diversity mode configuration corresponding to an intra slot antenna diversity scheme for uplink transmissions. The method may include receiving, from the UE, an uplink communication based at least in part on the intra slot antenna diversity scheme, wherein receiving the uplink communication comprises receiving a first portion of the uplink communication in a first part of a slot using a first subset of antennas of a set of antennas associated with the UE and receiving a second portion of the uplink communication in a second part of the slot using a second subset of antennas of the set of antennas.

Some aspects described herein relate to a non-transitory computer-readable medium that stores a set of instructions for wireless communication by a UE. The set of instructions, when executed by one or more processors of the UE, may cause the UE to receive an intra slot antenna diversity mode configuration corresponding to an intra slot antenna diversity scheme for uplink transmissions. The set of instructions, when executed by one or more processors of the UE, may cause the UE to transmit an uplink communication based at least in part on the intra slot antenna diversity scheme, wherein transmitting the uplink communication comprises transmitting a first portion of the uplink communication in a first part of a slot using a first subset of antennas of a set of antennas associated with the UE and transmitting a second portion of the uplink communication in a second part of the slot using a second subset of antennas of the set of antennas.

Some aspects described herein relate to a non-transitory computer-readable medium that stores a set of instructions for wireless communication by a base station. The set of instructions, when executed by one or more processors of the base station, may cause the base station to transmit, to a UE, an intra slot antenna diversity mode configuration corresponding to an intra slot antenna diversity scheme for uplink transmissions. The set of instructions, when executed by one or more processors of the base station, may cause the base station to receive, from the UE, an uplink communication based at least in part on the intra slot antenna diversity scheme, wherein receiving the uplink communication comprises receiving a first portion of the uplink communication in a first part of a slot using a first subset of antennas of a set of antennas associated with the UE and receiving a second portion of the uplink communication in a second part of the slot using a second subset of antennas of the set of antennas.

Some aspects described herein relate to an apparatus for wireless communication. The apparatus may include means for receiving an intra slot antenna diversity mode configuration corresponding to an intra slot antenna diversity scheme for uplink transmissions. The apparatus may include means for transmitting an uplink communication based at least in part on the intra slot antenna diversity scheme, wherein transmitting the uplink communication comprises transmitting a first portion of the uplink communication in a first part of a slot using a first subset of antennas of a set of antennas associated with the apparatus and transmitting a second portion of the uplink communication in a second part of the slot using a second subset of antennas of the set of antennas.

Some aspects described herein relate to an apparatus for wireless communication. The apparatus may include means for transmitting, to a UE, an intra slot antenna diversity mode configuration corresponding to an intra slot antenna diversity scheme for uplink transmissions. The apparatus may include means for receiving, from the UE, an uplink communication based at least in part on the intra slot antenna diversity scheme, wherein receiving the uplink communication comprises receiving a first portion of the uplink communication in a first part of a slot using a first subset of antennas of a set of antennas associated with the UE and receiving a second portion of the uplink communication in a second part of the slot using a second subset of antennas of the set of antennas.

Aspects generally include a method, apparatus, system, computer program product, non-transitory computer-readable medium, user equipment, base station, wireless communication device, and/or processing system as substantially described with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

DETAILED DESCRIPTION

Figure 1:
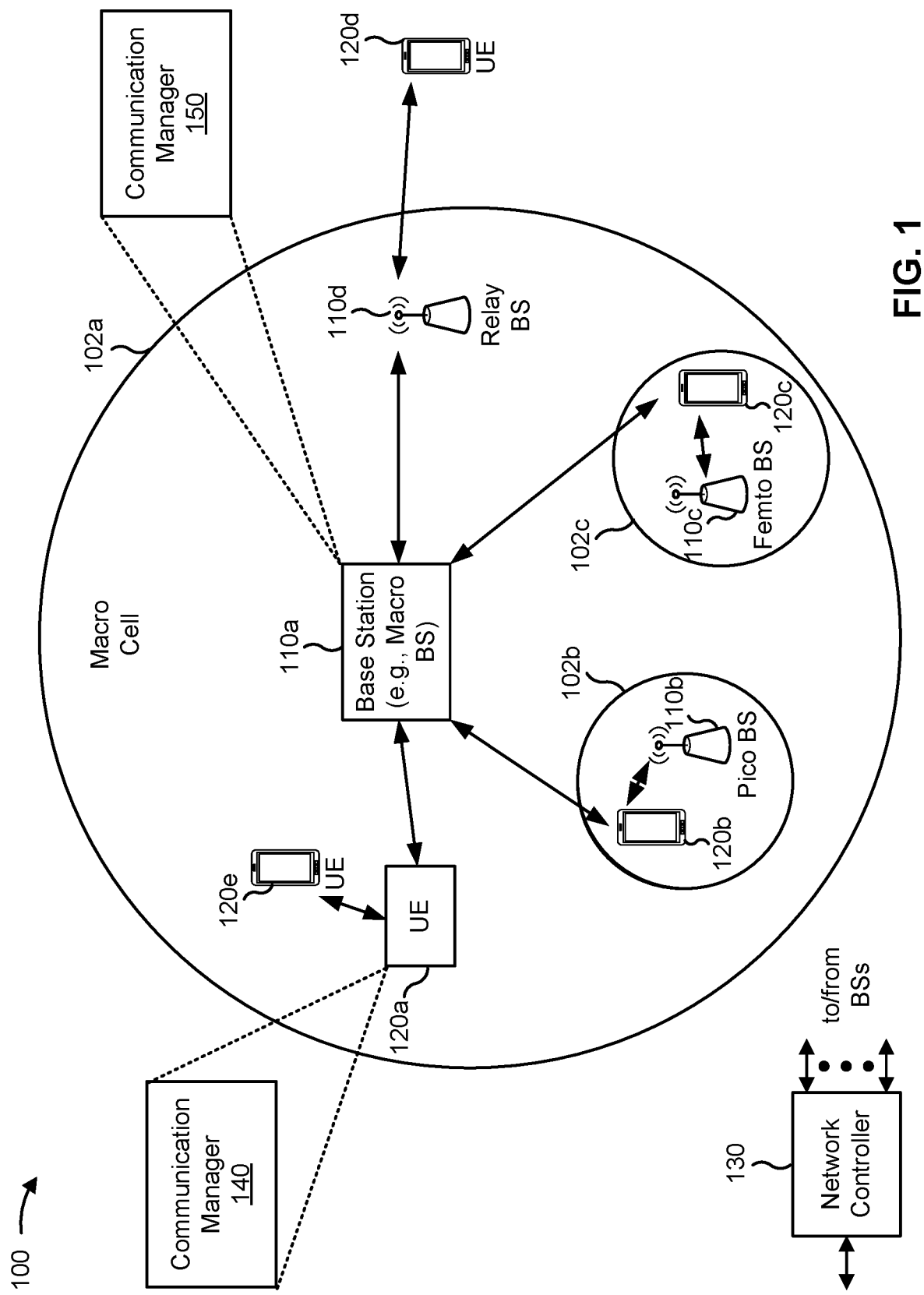
FIG. 1 is diagram illustrating an example of a wireless network.

The detailed description set forth below in connection with the appended drawings is intended as a description of various configurations and is not intended to represent the configurations in which the concepts described herein may be practiced. The detailed description includes specific details for the purposes of providing a thorough understanding of various concepts. However, it will be apparent to those skilled in the art that these concepts may be practiced without these specific details. In some instances, well-known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, or the like (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, or the like, whether referred to as software, firmware, middleware, microcode, hardware description language, or otherwise.

Accordingly, in one or more example embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can include a random-access memory (RAM), a read-only memory (ROM), an electrically erasable programmable ROM (EEPROM), compact disk ROM (CD-ROM) or other optical disk storage, magnetic disk storage or other magnetic storage devices, combinations of the aforementioned types of computer-readable media, or any other medium that can be used to store computer executable code in the form of instructions or data structures that can be accessed by a computer.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

FIG. 1 is a diagram illustrating a wireless network 100 in which aspects of the present disclosure may be practiced. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110a, a BS 110b, a BS 110c, and a BS 110d), a user equipment (UE) 120 or multiple UEs 120 (shown as a UE 120a, a UE 120b, a UE 120c, a UE 120d, and a UE 120e), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110a may be a macro base station for a macro cell 102a, the BS 110b may be a pico base station for a pico cell 102b, and the BS 110c may be a femto base station for a femto cell 102c. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110d (e.g., a relay base station) may communicate with the BS 110a (e.g., a macro base station) and the UE 120d in order to facilitate communication between the BS 110a and the UE 120d. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, 5G RAT networks may be deployed.

In some examples, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the UE 120 may include a communication manager 140. As described in more detail elsewhere herein, the communication manager 140 may receive an intra slot antenna diversity mode configuration corresponding to an intra slot antenna diversity scheme for uplink transmissions; and transmit an uplink communication based at least in part on the intra slot antenna diversity scheme, wherein transmitting the uplink communication comprises transmitting a first portion of the uplink communication in a first part of a slot using a first subset of antennas of a set of antennas associated with the UE and transmitting a second portion of the uplink communication in a second part of the slot using a second subset of antennas of the set of antennas. Additionally, or alternatively, the communication manager 140 may perform one or more other operations described herein.

In some aspects, the base station 110 may include a communication manager 150. As described in more detail elsewhere herein, the communication manager 150 may transmit, to a UE, an intra slot antenna diversity mode configuration corresponding to an intra slot antenna diversity scheme for uplink transmissions; and receive, from the UE, an uplink communication based at least in part on the intra slot antenna diversity scheme, wherein receiving the uplink communication comprises receiving a first portion of the uplink communication in a first part of a slot using a first subset of antennas of a set of antennas associated with the UE and receiving a second portion of the uplink communication in a second part of the slot using a second subset of antennas of the set of antennas. Additionally, or alternatively, the communication manager 150 may perform one or more other operations described herein.

As indicated above, FIG. 1 is provided as an example. Other examples may differ from what is described with regard to FIG. 1.

Figure 2:
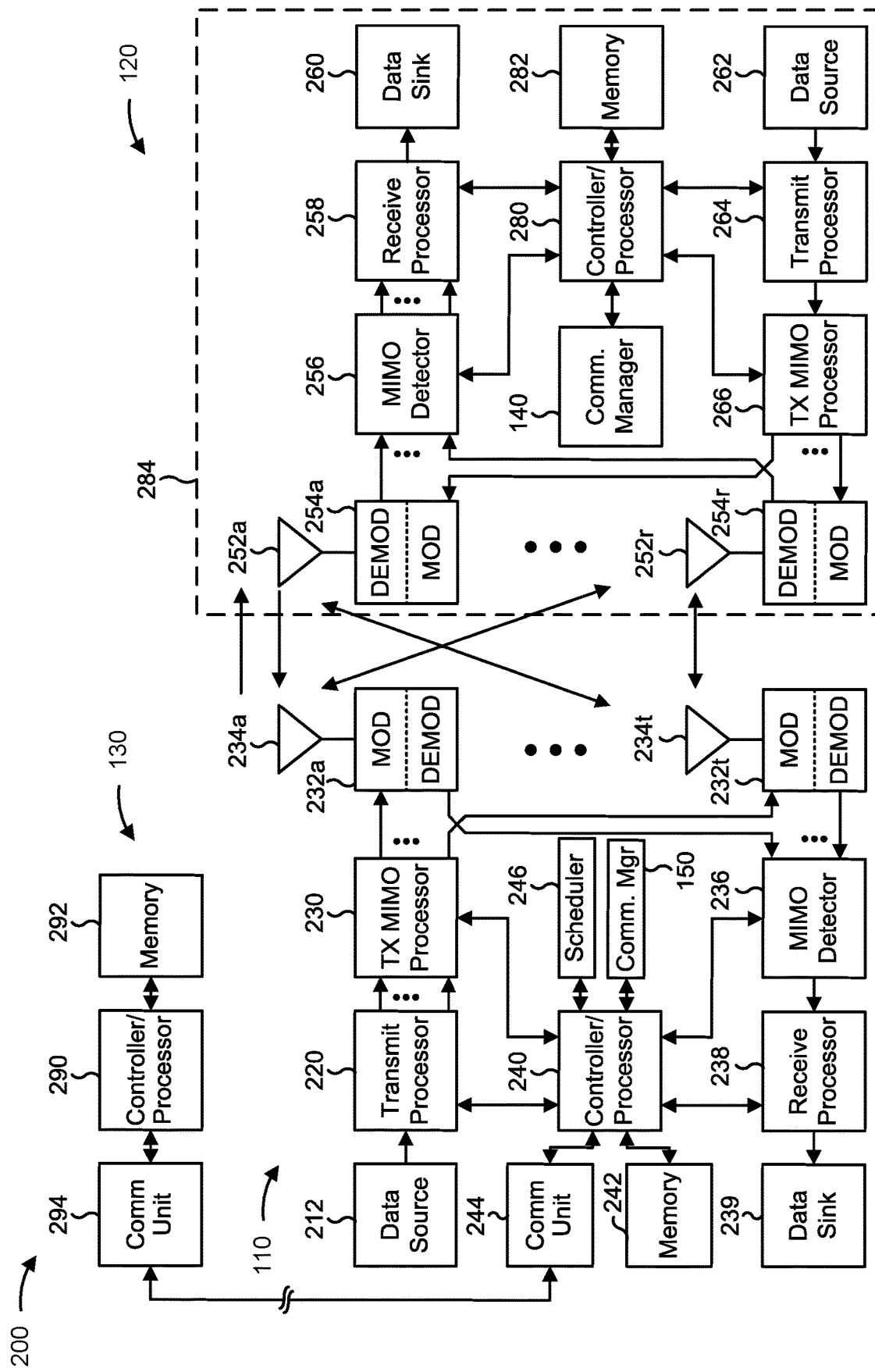
FIG. 2 is a diagram illustrating an example of a base station in communication with a user equipment (UE) in a wireless network.

FIG. 2 is a diagram illustrating an example 200 of a base station 110 in communication with a UE 120 in a wireless network 100, in accordance with the present disclosure. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein.

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein.

The controller/processor 240 of the base station 110, the controller/processor 280 of the UE 120, and/or any other component(s) of FIG. 2 may perform one or more techniques associated with intra slot antenna diversity for uplink transmissions, as described in more detail elsewhere herein. For example, the controller/processor 240 of the base station 110, the controller/processor 280 of the UE 120, and/or any other component(s) of FIG. 2 may perform or direct operations of, for example, method 400 of FIG. 4, method 500 of FIG. 5, and/or other methods as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, method 400 of FIG. 4, method 500 of FIG. 5, and/or other methods as described herein. In some examples, executing instructions may include running the instructions, converting the instructions, compiling the instructions, and/or interpreting the instructions, among other examples.

In some aspects, the UE includes means for receiving an intra slot antenna diversity mode configuration corresponding to an intra slot antenna diversity scheme for uplink transmissions; and/or means for transmitting an uplink communication based at least in part on the intra slot antenna diversity scheme, wherein transmitting the uplink communication comprises transmitting a first portion of the uplink communication in a first part of a slot using a first subset of antennas of a set of antennas associated with the UE and transmitting a second portion of the uplink communication in a second part of the slot using a second subset of antennas of the set of antennas. The means for the UE to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, the base station includes means for transmitting, to a UE, an intra slot antenna diversity mode configuration corresponding to an intra slot antenna diversity scheme for uplink transmissions; and/or means for receiving, from the UE, an uplink communication based at least in part on the intra slot antenna diversity scheme, wherein receiving the uplink communication comprises receiving a first portion of the uplink communication in a first part of a slot using a first subset of antennas of a set of antennas associated with the UE and receiving a second portion of the uplink communication in a second part of the slot using a second subset of antennas of the set of antennas. The means for the base station to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

In uplink, there are typically more antennas in use on the receiver (base station) side than on transmitter (UE) side. As a result, the UE may perform transmission antenna diversity or transmission antenna selection techniques. Antenna selection can be used in static scenarios while antenna diversity can be a better option for fast fading channels. UE antennas can suffer from a strong antenna imbalance (e.g., in FR1) and port imbalance (e.g., in FR2). In some examples, a UE can be configured with antennas and can further operate in a cyclic delay diversity mode or an antenna switch diversity mode. In cyclic delay diversity mode, the UE can simultaneously transmit on each of the antennas using a cyclic delay to produce signals with different cyclic phase/delay on the different antennas. In antenna switch diversity mode, the transmission can be switched between different antennas. Switching between cyclic delay diversity mode and the antenna switch diversity mode can be on a per-subframe or slot basis and based on various performance metrics (e.g., MCS, resource block (RB) allocation, and/or Doppler properties, among other examples).

In some cases, UEs can make antenna diversity selection and/or switching decisions with low periodicity to allow for obtaining sufficient measurements to facilitate a reliable antenna selection and/or switching decision and/or due to limitations of reference signal periodicity and/or availability in downlink (e.g., for antenna diversity switching schemes, the decision can be made once each 650 milliseconds (ms)). Thus, antenna selection and/or switching procedures can result in low responsiveness for different scenarios. As a result, tracking fast imbalance variations or fast antenna blockage events can be impossible due to the low rate of the selection and/or switching decisions. Furthermore, there can be a probability of mismatch in selection of the best antenna(s) (e.g., in case of low signal to noise ratio, limited bandwidth of reference signals for reference signal received power measurement, channel fading, and/or interference impacting the measurement, among other examples), and UEs can fail to properly select the best antenna(s) even for relatively static scenarios. In some cases in which frequency division duplexing is used, antenna selection and/or switching schemes can be inapplicable due to the lack of channel reciprocity between downlink and uplink. Consequently, antenna diversity selection and/or switching schemes can provide limited solutions to mitigate antenna imbalance, thereby having a negative impact on network performance.

Some aspects of the techniques and apparatuses described herein provide an intra slot antenna diversity scheme that a UE may use to transmit uplink communications while mitigating antenna imbalance. In some aspects, the intra slot antenna diversity scheme may be a fallback mechanism for various situations in which UE uplink antenna imbalance is poorly mitigated. Some of these situations may include situations in which relatively dynamic imbalance variations occur between the UE uplink antennas, situations in which antenna selection and/or switching decisions by the UE are outdated (e.g., after a specified duration associated with a UE sleep period without the UE obtaining downlink measurements), and/or situations in which an antenna imbalance is unknown, among other examples.

In some aspects, a decision to apply an intra slot antenna diversity scheme may be made by a network node such as a base station. The base station may make the decision based at least in part on one or more base station operations and/or one or more UE operations. For example, in some aspects, the decision may be a UE assisted decision in which the UE may provide a recommendation and/or information indicative of one or more parameter values associated with one or more subsets of antennas of a set of UE antennas. In some aspects, for example, based at least in part on downlink measurements associated with antenna imbalance and an observed antenna diversity reselection rate, the UE can provide an intra slot diversity mode recommendation for enabling the intra slot diversity mode for uplink transmissions. In some aspects, the recommendation may be accompanied by a report of one or more parameter values that may indicate, for example, an observed set of antenna imbalance measurements and/or antenna characteristics. In some aspects, the base station may obtain one or more parameter values associated with uplink reference signals and/or uplink communications, which may be used to facilitate a decision to configure the UE with an intra slot antenna diversity mode configuration.

In some aspects, the base station may transmit, and the UE may receive, an intra slot antenna diversity mode configuration corresponding to an intra slot antenna diversity scheme for uplink transmissions. The UE may transmit an uplink communication based at least in part on the intra slot antenna diversity scheme. Transmitting the uplink communication may include transmitting a first portion of the uplink communication in a first part of a slot using a first subset of antennas of a set of antennas associated with the UE and transmitting a second portion of the uplink communication in a second part of the slot using a second subset of antennas of the set of antennas. In this way, an intra slot antenna diversity scheme may result in improved reliability and link efficiency. Thus, some aspects of the techniques described herein may positively impact network performance.

Figure 3:
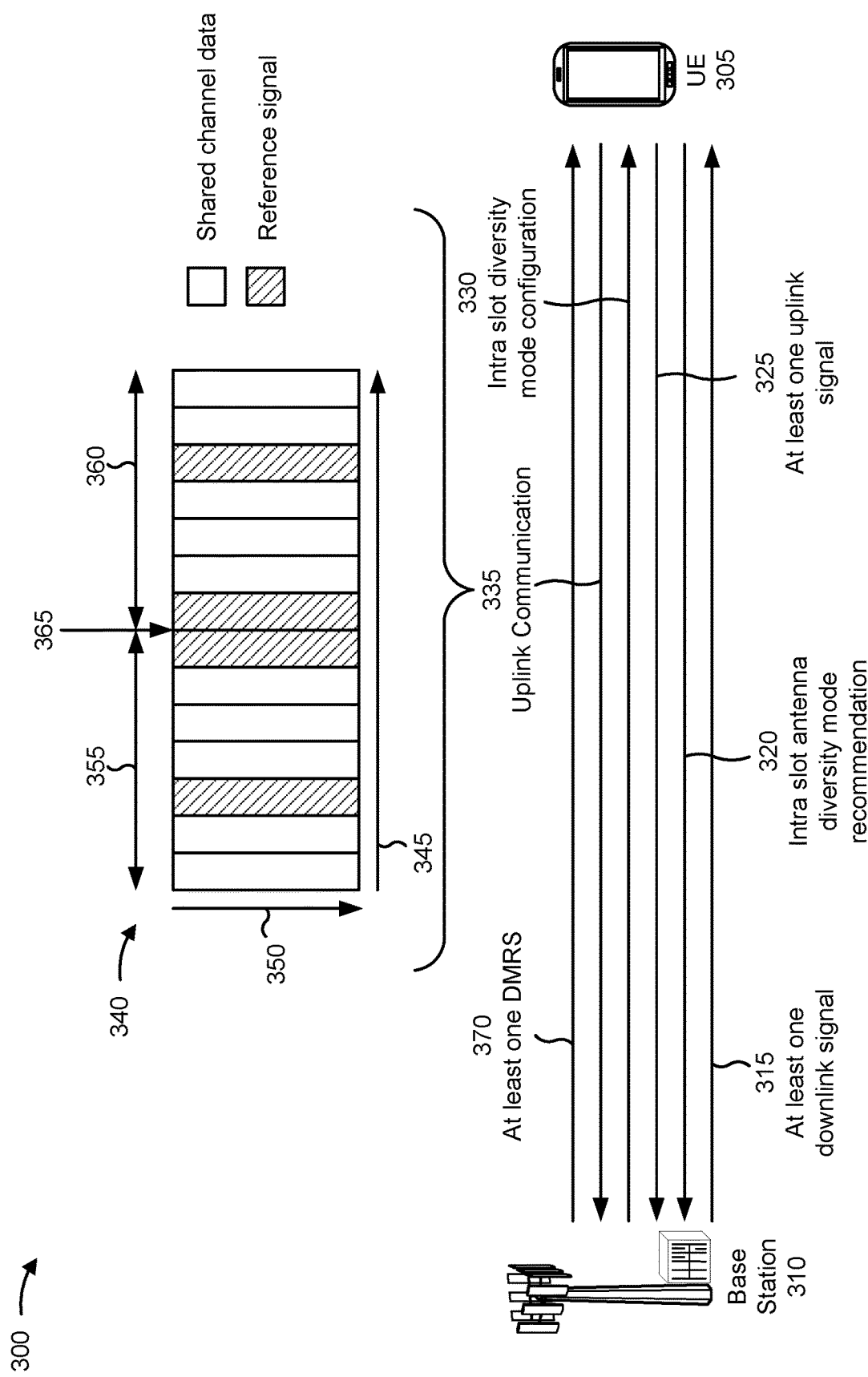
FIG. 3 is a diagram illustrating an example associated with intra slot antenna diversity for uplink transmissions.

FIG. 3 is a diagram illustrating an example 300 associated with intra slot antenna diversity for uplink transmissions, in accordance with the present disclosure. As shown in FIG. 3, a UE 305 and a base station 310 may communicate with one another. In some aspects, the UE 305 may be, or be similar to, the UE 120 depicted in FIGS. 1 and 2. In some aspects, the base station 310 may be, or be similar to, the base station 110 depicted in FIGS. 1 and 2.

At 315, the base station 310 may transmit, and the UE 305 may receive, at least one downlink signal. The at least one downlink signal may include at least one reference signal. The at least one downlink signal may be used for assessing channel conditions, antenna performance, and/or other wireless communication performance metrics. For example, in some aspects, one or more antenna imbalance parameters may correspond to the at least one downlink signal. In some aspects, the one or more antenna imbalance parameters may be predetermined. For example, the one or more antenna imbalance parameters may be predetermined according to a wireless communication standard.

At 320, the UE 305 may transmit, and the base station 310 may receive, an intra slot antenna diversity mode recommendation. In some aspects, the intra slot antenna diversity mode recommendation may be indicated by a dedicated bit in an uplink control information transmission. In some aspects, the intra slot antenna diversity mode recommendation may be indicated by a dedicated bit in a channel state feedback transmission.

In some aspects, the UE 305 may transmit, and the base station 310 may receive, an intra slot antenna diversity mode recommendation report that includes an indication of the intra slot antenna diversity mode recommendation. In some aspects, the intra slot antenna diversity mode recommendation report may be transmitted in a separate transmission from the intra slot antenna diversity mode recommendation. The intra slot antenna diversity mode recommendation report may indicate one or more antenna imbalance parameters associated with a set of UE antennas. In some aspects, the one or more antenna imbalance parameters may correspond to the at least one downlink signal. In some aspects, the intra slot antenna diversity mode recommendation report may indicate an antenna switch diversity scheme based antenna reselection rate, a signal to noise ratio associated with a current channel, and/or a modulation and coding scheme associated with the current channel, among other examples.

In some aspects, the intra slot antenna diversity mode recommendation may be based at least in part on at least one of the one or more antenna imbalance parameters, the antenna switch diversity scheme based antenna reselection rate, the signal to noise ratio associated with a current channel, or the modulation and coding scheme associated with the current channel, among other examples. The intra slot antenna diversity mode recommendation may be further based at least in part on at least one recommendation condition being satisfied. For example, in some aspects, the at least one recommendation condition may be satisfied based at least in part on a frequency of reselection (the number of times antenna reselection occurs during a specified time period) of at least one subset of antennas, having an associated imbalance level that is lower than an imbalance level associated with one or more other subsets of antennas of the set of antennas, satisfying a frequency threshold. In some aspects, the at least one recommendation condition may be satisfied based at least in part on a relative difference between a value of an antenna parameter associated with a first reselected subset of antennas and a value of the antenna parameter associated with a second reselected subset of antennas satisfying a difference threshold. In some aspects, the antenna parameter may be predetermined. For example, the antenna parameter may be predetermined according to a wireless communication standard. In some aspects, the at least one recommendation condition may be satisfied based at least in part on a signal to noise ratio associated with a channel and/or subset of antennas failing to satisfy a signal to noise ratio threshold. In some aspects, the at least one recommendation condition may be satisfied based at least in part on the modulation and coding scheme associated with a channel and/or subset of antennas failing to satisfy a modulation and coding scheme threshold. In some aspects, the at least one recommendation condition may be satisfied based at least in part on a combination of two or more of the above conditions.

At 325, the UE 305 may transmit, and the base station 310 may receive, at least one uplink signal. In some aspects, for example, the at least one uplink signal may include at least one reference signal. The at least one reference signal may include at least one sounding reference signal (e.g., an antenna switching reference signal).

At 330, the base station 310 may transmit, and the UE 305 may receive, an intra slot antenna diversity mode configuration corresponding to an intra slot antenna diversity scheme for uplink transmissions. In some aspects, the intra slot antenna diversity mode configuration may be transmitted using at least one configuration communication that includes the intra slot antenna diversity mode configuration. The at least one configuration communication may include, for example, a downlink control information transmission and/or a medium access control (MAC) control element (MAC CE). In some aspects, the downlink control information transmission may include a dedicated information element field carrying a value that indicates the intra slot antenna diversity mode configuration.

The base station 310 may transmit the intra slot antenna diversity mode configuration based at least in part on one or more parameters associated with the at least one uplink signal. In some aspects, the one or more parameters associated with the at least one uplink signal may be predetermined. For example, the one or more parameters associated with the at least one uplink signal may be predetermined according to a wireless communication standard. For example, in some aspects, the one or more parameters may indicate a frequency of antenna reselection between different sounding reference signal sessions that satisfies an antenna reselection threshold. The one or more parameters may indicate a reference signal received power difference between the different sounding reference signal sessions that satisfies a reference signal received power difference threshold. In some aspects, the one or more parameters may indicate a frequency of variation of values of reference signal received power associated with a plurality of sounding reference signal ports associated with a plurality of sounding reference signal resources that satisfies a frequency of variation threshold. In some aspects, for example, the one or more parameters may indicate a reference signal received power difference between two or more of the plurality of sounding reference signal ports that satisfies a reference signal received power difference threshold. The plurality of sounding reference signal ports may correspond to a codebook-based sounding reference signal configuration. In some aspects, the one or more parameters may indicate a signal parameter, a channel power level, a channel stability level, a dynamic uplink antenna blockage, an instable antenna switch diversity scheme reselection decision, and/or an instable antenna switch diversity scheme reselection measurement, among other examples. The one or more parameters may be associated with at least one of a first subset of antennas or a second subset of antennas.

In some aspects, the base station 310 may transmit the intra slot antenna diversity mode configuration based at least in part on a failure to determine an antenna imbalance parameter associated with the UE 305. The base station 310 may transmit the intra slot antenna diversity mode configuration based at least in part on a delay time period between a time associated with a last indication of an antenna reselection or a UE 305 downlink measurement and a time associated with a next indication of an antenna reselection or a UE 305 downlink measurement.

At 335, the UE 305 may transmit, and the base station 310 may receive, an uplink communication. The uplink communication may be based at least in part on an intra slot antenna diversity scheme. For example, the intra slot antenna diversity mode configuration may configure the UE 305 with the intra slot antenna diversity mode, and the UE 305 may initiate the intra slot antenna diversity mode to transmit the uplink communication.

The UE 305 may transmit the uplink communication by dividing the uplink communication between two subsets of antennas within a slot. In some aspects, the uplink communication may include a cyclic prefix orthogonal frequency division multiplexing waveform or a discrete Fourier transform spread orthogonal frequency division multiplexing waveform. As shown in FIG. 3, a slot 340 may include number of symbols (illustrated as rectangles in FIG. 3) along a time dimension 345 and having a frequency dimension 350 (e.g., indicated by a resource element index). Some of the symbols may be configured transmission of shared channel data and some of the symbols may be configured for transmission of reference signals (e.g., demodulation reference signals). As shown in FIG. 3, the UE 305 may transmit the uplink communication based on transmitting a first portion of the uplink communication in a first part 355 of the slot 340 using a first subset of antennas of a set of antennas associated with the UE 305 and transmitting a second portion of the uplink communication in a second part 360 of the slot 340 using a second subset of antennas of the set of antennas. The first part 355 of the slot 340 may include a first set of symbols of the slot 340, and the second part 360 of the slot 340 may include a second set of symbols. The UE 305 may switch from the first subset of antennas to the second subset of antennas at a switch point 365. The switch point 365 may be a time instance at which the UE 305 switches from using the first subset of antennas to using the second subset of antennas. In some aspects, for example, the switch point 365 may be located in the middle of the slot 340 so that the first part 355 includes the first half of the symbols of the slot 340 and the second part 360 includes the second half of the symbols of the slot 340.

In some aspects, the first and second subsets of antennas may be the best UE 305 antennas of a set of UE 305 antennas in terms of relative imbalance. For example, in some aspects, a relative antenna imbalance level associated with at least one of the first subset of antennas or the second subset of antennas may be less than at least one additional relative imbalance level associated with at least one additional subset of antennas of the set of antennas. In some aspects, the first subset of antennas and the second subset of antennas may be mutually exclusive, which may facilitate antenna diversity. For example, the second subset of antennas may not include any antennas of the first subset of antennas.

In some aspects, the uplink communication may be based at least in part on a frequency first mapping operation. In a frequency-first mapping operation, symbols may be arranged along the frequency dimension 350 for a given time increment before other time resources are utilized. Frequency-first mapping may group certain types of information into regions (e.g., time-critical control information, data, reference signals) within the uplink slot 340, and may also arrange certain data or information within a particular region according to a certain order (e.g., more important or time sensitive data towards the beginning of a region). Frequency-first mapping may include populating a contiguous band of frequency resources (e.g., not skipping any frequency resources) with a particular type of information (e.g., control information or data) within a given time increment. In other cases, the frequency resources for a given time increment may be populated in an alternating pattern with data from two or more regions. For example, for a given time increment, a subset of frequency resources may be populated with data, and a different subset of frequency resources may be populated with reference signals. In some aspects in which frequency first mapping is used, implementation of an intra slot antenna diversity scheme described herein may not require any new signaling and can be implemented in connection with a frequency hopping mode specified by a wireless communication standard.

In some aspects, the intra slot antenna diversity scheme may apply antenna diversity at a transport block level based at least in part on the frequency first mapping operation. In some aspects, the intra slot antenna diversity mode configuration may be associated with a frequency hopping mode configuration based at least in part on the frequency first mapping operation. In some aspects, for example, the UE 305 may retransmit, based at least in part on the frequency first mapping operation, one or more code block groups associated with one of the first subset of antennas and the second subset of antennas having a signal level that is lower than a signal level of the other of the first subset of antennas and the second subset of antennas.

In some aspects, the uplink communication may be based at least in part on a time first mapping operation. In a time first mapping operation, symbols within the slot 340 are populated along the time dimension first (e.g., row-wise from the perspective of a time-frequency grid) and then along the frequency dimension (e.g., column-wise from the perspective of a time-frequency grid). Representing a slot as a time-frequency grid, time first mapping may include beginning at the bottom left of the grid, progressing forward in the time dimension along a particular frequency resource (i.e., along a particular row), moving up along the frequency dimension (i.e., to another row), and then progressing backwards in the time dimension at a higher frequency resource than before (e.g., creating a zig-zag pattern).

In some aspects, the intra slot antenna diversity scheme may apply antenna diversity at a code block level based at least in part on the time first mapping operation. In some aspects, the intra slot antenna diversity mode configuration may be not associated with a frequency hopping mode configuration based at least in part on the time first mapping operation. In some aspects, when time first mapping is used to implement an intra slot antenna diversity scheme described herein, a transmission mode definition may specify the intra slot antenna diversity scheme and may be decoupled from frequency hopping.

At 370, the UE 305 may transmit, and the base station 310 may receive, at least one demodulation reference signal based at least in part on a frequency hopping operation indicated by the intra slot antenna diversity mode configuration.

As indicated above, FIG. 3 is provided as an example. Other examples may differ from what is described with respect to FIG. 3.

Figure 4:
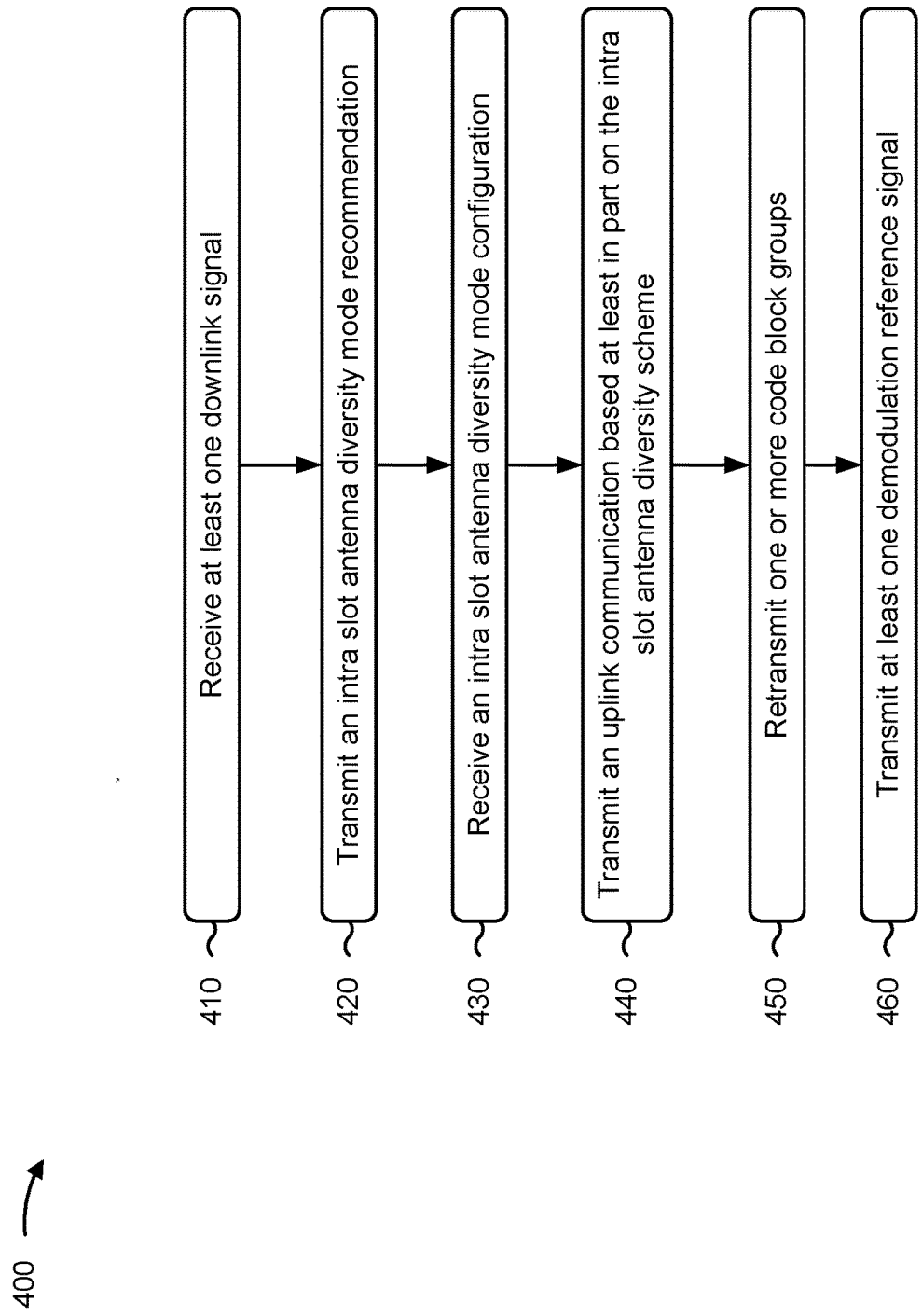
FIGS. 4 and 5 are flowcharts of example methods of wireless communication.

FIG. 4 is a flowchart of an example method 400 of wireless communication. The method 400 may be performed by, for example, a UE (e.g., UE 305).

At 410, the UE may receive at least one downlink signal. For example, the UE (e.g., using communication manager 608 and/or reception component 602, depicted in FIG. 6) may receive at least one downlink signal, wherein one or more antenna imbalance parameters correspond to the at least one downlink signal, as described above in connection with, for example, FIG. 3 and at 315. In some aspects, the at least one downlink signal comprises at least one reference signal.

At 420, the UE may transmit an intra slot antenna diversity mode recommendation. For example, the UE (e.g., using communication manager 608 and/or transmission component 604, depicted in FIG. 6) may transmit an intra slot antenna diversity mode recommendation, wherein receiving the intra slot antenna diversity mode configuration comprises receiving the intra slot antenna diversity mode configuration based at least in part on the intra slot antenna diversity mode recommendation, as described above in connection with, for example, FIG. 3 and at 320. In some aspects, the intra slot antenna diversity mode recommendation is based at least in part on at least one of the one or more antenna imbalance parameters, an antenna switch diversity scheme based antenna reselection rate, a signal to noise ratio associated with a current channel, or a modulation and coding scheme associated with the current channel. In some aspects, the intra slot antenna diversity mode recommendation is further based at least in part on at least one recommendation condition being satisfied, wherein the at least one recommendation condition is satisfied based at least in part on at least one of a frequency of reselection of at least one subset of antennas, having an associated imbalance level that is lower than an imbalance level associated with one or more other subsets of antennas of the set of antennas, satisfying a frequency threshold, a relative difference between a value of an antenna parameter associated with a first reselected subset of antennas and a value of the antenna parameter associated with a first reselected subset of antennas satisfying a difference threshold, the signal to noise ratio failing to satisfy a signal to noise ratio threshold, or the modulation and coding scheme failing to satisfy a modulation and coding scheme threshold.

In some aspects, transmitting the intra slot antenna diversity mode recommendation comprises transmitting an uplink control information transmission comprising a dedicated bit that indicates the intra slot antenna diversity mode recommendation. In some aspects, transmitting the intra slot antenna diversity mode recommendation comprises transmitting a channel state feedback transmission comprising a dedicated bit that indicates the intra slot antenna diversity mode recommendation. In some aspects, transmitting the intra slot antenna diversity mode recommendation comprises transmitting an intra slot antenna diversity mode recommendation report that includes an indication of the intra slot antenna diversity mode recommendation. In some aspects, the intra slot antenna diversity mode recommendation report indicates one or more antenna imbalance parameters associated with the set of antennas.

At 430, the UE may receive an intra slot antenna diversity mode configuration. For example, the UE (e.g., using communication manager 608 and/or reception component 602, depicted in FIG. 6) may receive an intra slot antenna diversity mode configuration corresponding to an intra slot antenna diversity scheme for uplink transmissions, as described above in connection with, for example, FIG. 3 and at 330. In some aspects, receiving the intra slot antenna diversity mode configuration comprises receiving at least one configuration communication that includes the intra slot antenna diversity mode configuration, the at least one configuration communication comprising at least one of a downlink control information transmission or a MAC CE. In some aspects, the downlink control information transmission includes a dedicated information element field carrying a value that indicates the intra slot antenna diversity mode configuration.

At 440, the UE may transmit an uplink communication based at least in part on the intra slot antenna diversity scheme. For example, the UE (e.g., using communication manager 608 and/or transmission component 604, depicted in FIG. 6) may transmit an uplink communication based at least in part on the intra slot antenna diversity scheme, wherein transmitting the uplink communication comprises transmitting a first portion of the uplink communication in a first part of a slot using a first subset of antennas of a set of antennas associated with the UE and transmitting a second portion of the uplink communication in a second part of the slot using a second subset of antennas of the set of antennas, as described above in connection with, for example, FIG. 3 and at 335. In some aspects, the first subset of antennas and the second subset of antennas are mutually exclusive. In some aspects, a relative antenna imbalance level associated with at least one of the first subset of antennas or the second subset of antennas is less than at least one additional relative imbalance level associated with at least one additional subset of antennas of the set of antennas. In some aspects, the uplink communication comprises a cyclic prefix orthogonal frequency division multiplexing waveform or a discrete Fourier transform spread orthogonal frequency division multiplexing waveform.

In some aspects, the uplink communication is based at least in part on a frequency first mapping operation. In some aspects, the intra slot antenna diversity scheme applies antenna diversity at a transport block level based at least in part on the frequency first mapping operation. In some aspects, the intra slot antenna diversity mode configuration is associated with a frequency hopping mode configuration based at least in part on the frequency first mapping operation.

At 450, the UE may retransmit, based at least in part on the frequency first mapping operation, one or more code block groups associated with one of the first subset and the second subset having a signal level that is lower than a signal level of the other of the first subset and the second subset. For example, the UE (e.g., using communication manager 608 and/or transmission component 604, depicted in FIG. 6) may retransmit, based at least in part on the frequency first mapping operation, one or more code block groups associated with one of the first subset and the second subset having a signal level that is lower than a signal level of the other of the first subset and the second subset, as described above in connection with, for example, FIG. 3 and at 325.

At 460, the UE may transmit at least one demodulation reference signal. For example, the UE (e.g., using communication manager 608 and/or transmission component 604, depicted in FIG. 6) may transmit at least one demodulation reference signal based at least in part on a frequency hopping operation indicated by the intra slot antenna diversity mode configuration, as described above in connection with, for example, FIG. 3 and at 370.

In some aspects, the uplink communication is based at least in part on a time first mapping operation. In some aspects, the intra slot antenna diversity scheme applies antenna diversity at a code block level based at least in part on the time first mapping operation. In some aspects, the intra slot antenna diversity mode configuration is not associated with a frequency hopping mode configuration based at least in part on the time first mapping operation.

Although FIG. 4 shows example blocks of method 400, in some aspects, method 400 may include additional blocks, fewer blocks, different blocks, or differently arranged blocks than those depicted in FIG. 4. Additionally, or alternatively, two or more of the blocks of method 400 may be performed in parallel.

Figure 5:

FIG. 5 is a flowchart of an example method 500 of wireless communication. The method 500 may be performed by, for example, a base station (e.g., base station 310).

At 510, the base station may receive at least one uplink signal. For example, the base station (e.g., using communication manager 808 and/or reception component 802, depicted in FIG. 8) may receive at least one uplink signal, wherein transmitting the intra slot antenna diversity mode configuration comprises transmitting the intra slot antenna diversity mode configuration based at least in part on one or more parameters associated with the at least one uplink signal, as described above in connection with, for example, FIG. 3 and at 325. In some aspects, the at least one uplink signal comprises at least one reference signal. In some aspects, the at least one reference signal comprises at least one sounding reference signal. In some aspects, the least one sounding reference signal comprises an antenna switching sounding reference signal. In some aspects, the one or more parameters indicate a frequency of antenna reselection between different sounding reference signal sessions that satisfies an antenna reselection threshold, and wherein the one or more parameters indicate a reference signal received power difference between the different sounding reference signal sessions that satisfies a reference signal received power difference threshold.

In some aspects, the one or more parameters indicate a frequency of variation of values of reference signal received power associated with a plurality of sounding reference signal ports associated with a plurality of sounding reference signal resources that satisfies a frequency of variation threshold, wherein the one or more parameters indicate a reference signal received power difference between two or more of the plurality of sounding reference signal ports that satisfies a reference signal received power difference threshold. In some aspects, the plurality of sounding reference signal ports corresponds to a codebook-based sounding reference signal configuration. In some aspects, the one or more parameters indicate at least one of a signal parameter, a channel power level, a channel stability level, a dynamic uplink antenna blockage, an instable antenna switch diversity scheme reselection decision, or an instable antenna switch diversity scheme reselection measurement. In some aspects, the one or more parameters are associated with at least one of the first subset of antennas or the second subset of antennas.

At 520, the base station may transmit at least one downlink signal. For example, the base station (e.g., using communication manager 808 and/or transmission component 804, depicted in FIG. 8) may transmit at least one downlink signal, wherein the one or more antenna imbalance parameters correspond to the at least one downlink signal, as described above in connection with, for example, FIG. 3 and at 315. In some aspects, the at least one downlink signal comprises at least one reference signal. In some aspects, for example, the at least one downlink signal may include a channel state information reference signal.

At 530, the base station may receive an intra slot antenna diversity mode recommendation. For example, the base station (e.g., using communication manager 808 and/or reception component 802, depicted in FIG. 8) may receive an intra slot antenna diversity mode recommendation, as described above in connection with, for example, FIG. 3 and at 320. In some aspects, receiving the intra slot antenna diversity mode recommendation comprises receiving an uplink control information transmission comprising a dedicated bit that indicates the intra slot antenna diversity mode recommendation. In some aspects, receiving the intra slot antenna diversity mode recommendation comprises receiving a channel state feedback transmission comprising a dedicated bit that indicates the intra slot antenna diversity mode recommendation. In some aspects, receiving the intra slot antenna diversity mode recommendation comprises receiving an intra slot antenna diversity mode recommendation report that includes an indication of the intra slot antenna diversity mode recommendation. In some aspects, the intra slot antenna diversity mode recommendation report indicates one or more antenna imbalance parameters associated with the set of antennas.

In some aspects, the intra slot antenna diversity mode recommendation is based at least in part on at least one of one or more antenna imbalance parameters, an antenna switch diversity scheme based antenna reselection rate, a signal to noise ratio associated with a current channel, or a modulation and coding scheme associated with the current channel. In some aspects, the intra slot antenna diversity mode recommendation is further based at least in part on at least one recommendation condition being satisfied, wherein the at least one recommendation condition is satisfied based at least in part on at least one of a frequency of reselection of at least one subset of antennas, having an associated imbalance level that is lower than an imbalance level associated with one or more other subsets of antennas of the set of antennas, satisfying a frequency threshold, a relative difference between a value of an antenna parameter associated with a first reselected subset of antennas and a value of the antenna parameter associated with a first reselected subset of antennas satisfying a difference threshold, the signal to noise ratio failing to satisfy a signal to noise ratio threshold, or the modulation and coding scheme failing to satisfy a modulation and coding scheme threshold.

At 540, the base station may transmit, to a UE, an intra slot antenna diversity mode configuration. For example, the base station (e.g., using communication manager 808 and/or transmission component 804, depicted in FIG. 8) may transmit, to a UE, an intra slot antenna diversity mode configuration corresponding to an intra slot antenna diversity scheme for uplink transmissions, as described above in connection with, for example, FIG. 3 and at 330. In some aspects, transmitting the intra slot antenna diversity mode configuration comprises transmitting the intra slot antenna diversity mode configuration based at least in part on the intra slot antenna diversity mode recommendation. In some aspects, transmitting the intra slot antenna diversity mode configuration comprises transmitting at least one configuration communication that includes the intra slot antenna diversity mode configuration, the at least one configuration communication comprising at least one of a downlink control information transmission or a MAC CE. In some aspects, the downlink control information transmission includes a dedicated information element field carrying a value that indicates the intra slot antenna diversity mode configuration.

In some aspects, transmitting the intra slot antenna diversity mode configuration comprises transmitting the intra slot antenna diversity mode configuration based at least in part on a failure to determine an antenna imbalance parameter associated with the UE. In some aspects, transmitting the intra slot antenna diversity mode configuration comprises transmitting the intra slot antenna diversity mode configuration based at least in part on a delay time period between a time associated with a last indication of an antenna reselection or a UE downlink measurement and a time associated with a next indication of an antenna reselection or a UE downlink measurement.

At 550, the base station may receive, from the UE, an uplink communication. For example, the base station (e.g., using communication manager 808 and/or reception component 802, depicted in FIG. 8) may receive, from the UE, an uplink communication based at least in part on the intra slot antenna diversity scheme, wherein receiving the uplink communication comprises receiving a first portion of the uplink communication in a first part of a slot using a first subset of antennas of a set of antennas associated with the UE and receiving a second portion of the uplink communication in a second part of the slot using a second subset of antennas of the set of antennas, as described above in connection with, for example, FIG. 3 and at 335. In some aspects, the uplink communication comprises a cyclic prefix orthogonal frequency division multiplexing waveform or a discrete Fourier transform spread orthogonal frequency division multiplexing waveform. In some aspects, the first subset of antennas and the second subset of antennas are mutually exclusive. In some aspects, a relative antenna imbalance level associated with at least one of the first subset of antennas or the second subset of antennas is less than at least one additional relative imbalance level associated with at least one additional subset of antennas of the set of antennas.

In some aspects, the uplink communication is based at least in part on a frequency first mapping operation. In some aspects, the intra slot antenna diversity scheme applies antenna diversity at a transport block level based at least in part on the frequency first mapping operation. In some aspects, the intra slot antenna diversity mode configuration is associated with a frequency hopping mode configuration based at least in part on the frequency first mapping operation. In some aspects, the uplink communication is based at least in part on a time first mapping operation. In some aspects, the intra slot antenna diversity scheme applies antenna diversity at a code block level based at least in part on the time first mapping operation. In some aspects, the intra slot antenna diversity mode configuration is not associated with a frequency hopping mode configuration based at least in part on the time first mapping operation.

At 560, the base station may receive, based at least in part on the frequency first mapping operation, a retransmission of one or more code block groups. For example, the base station (e.g., using communication manager 808 and/or reception component 802, depicted in FIG. 8) may receive, based at least in part on the frequency first mapping operation, a retransmission of one or more code block groups associated with one of the first subset and the second subset having a signal level that is lower than a signal level of the other of the first subset and the second subset, as described above in connection with, for example, FIG. 3 and at 335. At 570, the base station may receive at least one demodulation reference signal. For example, the base station (e.g., using communication manager 808 and/or reception component 802, depicted in FIG. 8) may receive at least one demodulation reference signal based at least in part on a frequency hopping operation indicated by the intra slot antenna diversity mode configuration, as described above in connection with, for example, FIG. 3 and at 370.

Although FIG. 5 shows example blocks of method 500, in some aspects, method 500 may include additional blocks, fewer blocks, different blocks, or differently arranged blocks than those depicted in FIG. 5. Additionally, or alternatively, two or more of the blocks of method 500 may be performed in parallel.

Figure 6:
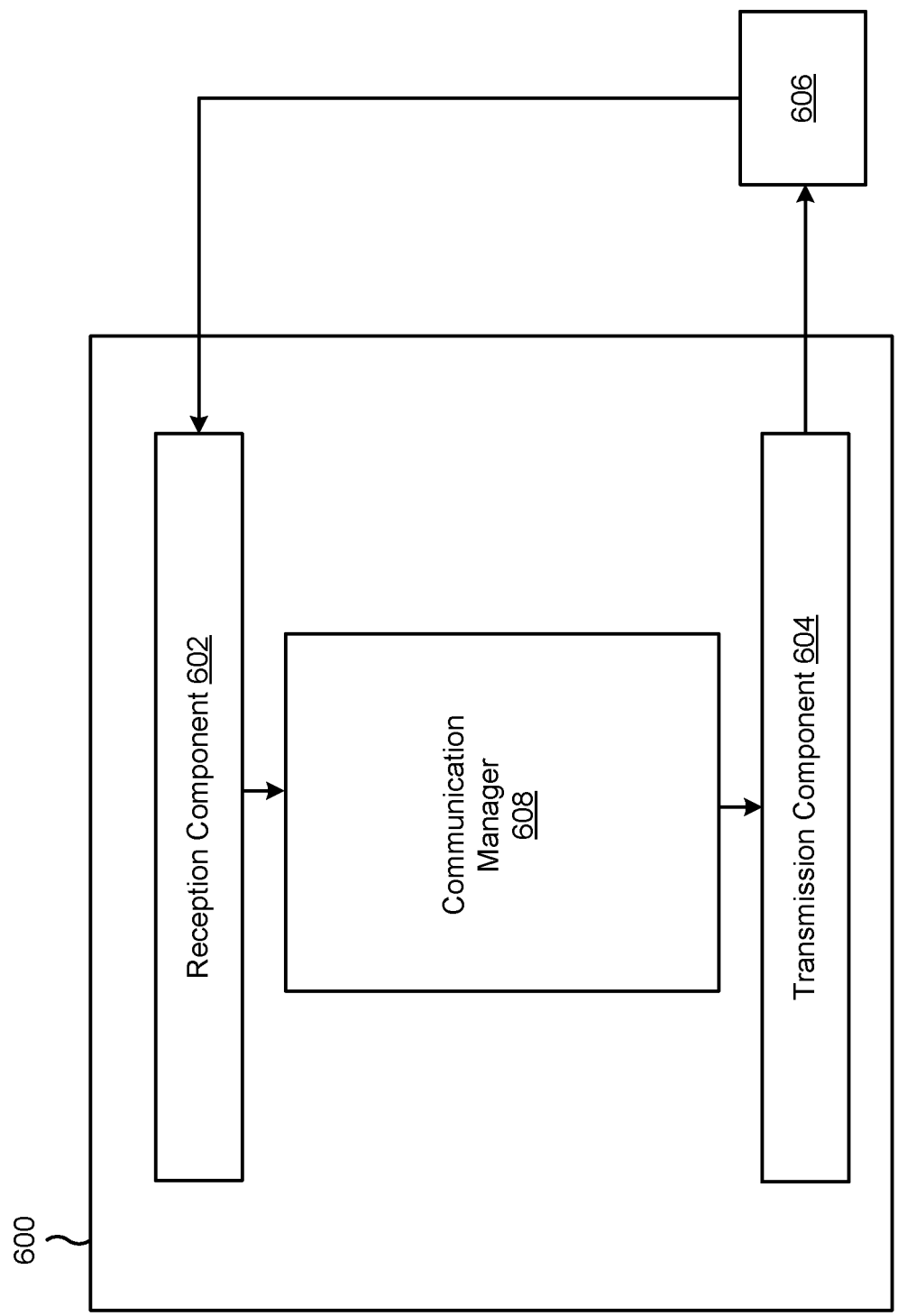
FIG. 6 is a diagram of an example apparatus for wireless communication.

FIG. 6 is a diagram of an example apparatus 600 for wireless communication. The apparatus 600 may be a UE, or a UE may include the apparatus 600. In some aspects, the apparatus 600 includes a reception component 602 and a transmission component 604, which may be in communication with one another (for example, via one or more buses and/or one or more other components). As shown, the apparatus 600 may communicate with another apparatus 606 (such as a UE, a base station, or another wireless communication device) using the reception component 602 and the transmission component 604. As further shown, the apparatus 600 may include a communication manager 608.

In some aspects, the apparatus 600 may be configured to perform one or more operations described herein in connection with FIG. 3. Additionally, or alternatively, the apparatus 600 may be configured to perform one or more methods described herein, such as method 400 of FIG. 4. In some aspects, the apparatus 600 and/or one or more components shown in FIG. 6 may include one or more components of the UE described in connection with FIG. 2. Additionally, or alternatively, one or more components shown in FIG. 6 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 602 may receive communications, such as reference signals, control information, data communications, or a combination thereof, from the apparatus 606. The reception component 602 may provide received communications to one or more other components of the apparatus 600. In some aspects, the reception component 602 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 600. In some aspects, the reception component 602 may include one or more antennas, a modem, a demodulator, a MIMO detector, a receive processor, a controller/processor, a memory, or a combination thereof, of the UE described in connection with FIG. 2.

The transmission component 604 may transmit communications, such as reference signals, control information, data communications, or a combination thereof, to the apparatus 606. In some aspects, one or more other components of the apparatus 600 may generate communications and may provide the generated communications to the transmission component 604 for transmission to the apparatus 606. In some aspects, the transmission component 604 may perform signal processing on the generated communications (such as filtering, amplification, modulation, digital-to-analog conversion, multiplexing, interleaving, mapping, or encoding, among other examples), and may transmit the processed signals to the apparatus 606. In some aspects, the transmission component 604 may include one or more antennas, a modem, a modulator, a transmit MIMO processor, a transmit processor, a controller/processor, a memory, or a combination thereof, of the UE described in connection with FIG. 2. In some aspects, the transmission component 604 may be co-located with the reception component 602 in a transceiver.

The communication manager 608 and/or the reception component 602 may receive an intra slot antenna diversity mode configuration corresponding to an intra slot antenna diversity scheme for uplink transmissions. The communication manager 608 and/or the transmission component 604 may transmit an uplink communication based at least in part on the intra slot antenna diversity scheme, wherein transmitting the uplink communication comprises transmitting a first portion of the uplink communication in a first part of a slot using a first subset of antennas of a set of antennas associated with the UE and transmitting a second portion of the uplink communication in a second part of the slot using a second subset of antennas of the set of antennas. In some aspects, the communication manager 608 may be, or be similar to, the communication manager 140 depicted in FIGS. 1 and 2. In some aspects, the communication manager 608 may include one or more antennas, a modem, a controller/processor, a memory, or a combination thereof, of the UE described in connection with FIG. 2. In some aspects, the communication manager 608 may include the reception component 602 and/or the transmission component 604.

The communication manager 608 and/or the transmission component 604 may transmit an intra slot antenna diversity mode recommendation, wherein receiving the intra slot antenna diversity mode configuration comprises receiving the intra slot antenna diversity mode configuration based at least in part on the intra slot antenna diversity mode recommendation. The communication manager 608 and/or the reception component 602 may receive at least one downlink signal, wherein the one or more antenna imbalance parameters correspond to the at least one downlink signal.

The communication manager 608 and/or the transmission component 604 may retransmit, based at least in part on the frequency first mapping operation, one or more code block groups associated with one of the first subset and the second subset having a signal level that is lower than a signal level of the other of the first subset and the second subset. The communication manager 608 and/or the transmission component 604 may transmit at least one demodulation reference signal based at least in part on a frequency hopping operation indicated by the intra slot antenna diversity mode configuration.

The number and arrangement of components shown in FIG. 6 are provided as an example. In practice, there may be additional components, fewer components, different components, or differently arranged components than those shown in FIG. 6. Furthermore, two or more components shown in FIG. 6 may be implemented within a single component, or a single component shown in FIG. 6 may be implemented as multiple, distributed components. Additionally, or alternatively, a set of (one or more) components shown in FIG. 6 may perform one or more functions described as being performed by another set of components shown in FIG. 6.

Figure 7:
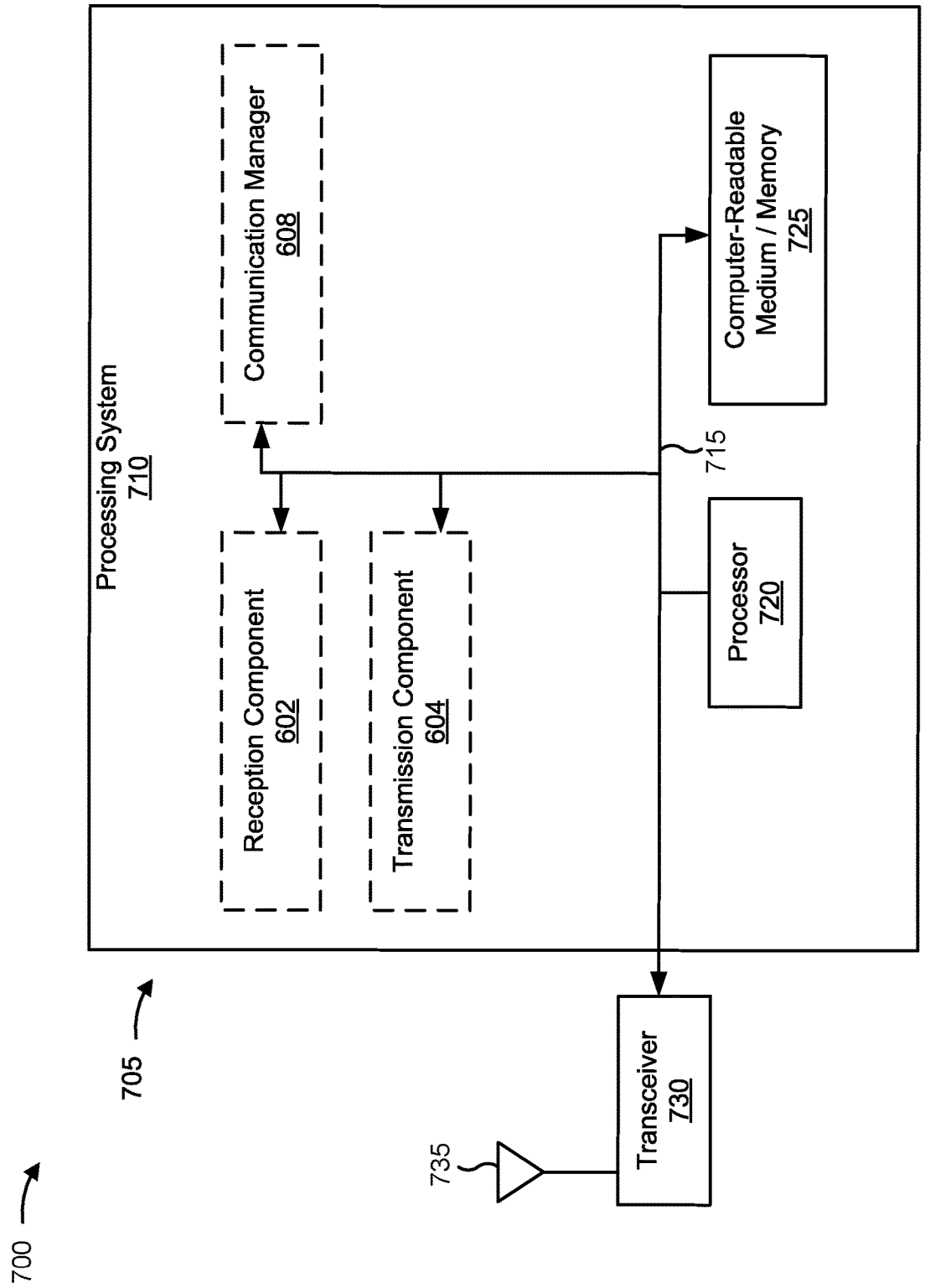
FIG. 7 is a diagram illustrating an example of a hardware implementation for an apparatus employing a processing system.

FIG. 7 is a diagram illustrating an example 700 of a hardware implementation for an apparatus 705 employing a processing system 710. The apparatus 705 may be a UE.

The processing system 710 may be implemented with a bus architecture, represented generally by the bus 715. The bus 715 may include any number of interconnecting buses and bridges depending on the specific application of the processing system 710 and the overall design constraints. The bus 715 links together various circuits including one or more processors and/or hardware components, represented by the processor 720, the illustrated components, and the computer-readable medium/memory 725. The bus 715 may also link various other circuits, such as timing sources, peripherals, voltage regulators, and/or power management circuits.

The processing system 710 may be coupled to a transceiver 730. The transceiver 730 is coupled to one or more antennas 735. The transceiver 730 provides a means for communicating with various other apparatuses over a transmission medium. The transceiver 730 receives a signal from the one or more antennas 735, extracts information from the received signal, and provides the extracted information to the processing system 710, specifically the reception component 602. In addition, the transceiver 730 receives information from the processing system 710, specifically the transmission component 604, and generates a signal to be applied to the one or more antennas 735 based at least in part on the received information.

The processing system 710 includes a processor 720 coupled to a computer-readable medium/memory 725. The processor 720 is responsible for general processing, including the execution of software stored on the computer-readable medium/memory 725. The software, when executed by the processor 720, causes the processing system 710 to perform the various functions described herein for any particular apparatus. The computer-readable medium/memory 725 may also be used for storing data that is manipulated by the processor 720 when executing software. The processing system further includes at least one of the illustrated components. The components may be software modules running in the processor 720, resident/stored in the computer-readable medium/memory 725, one or more hardware modules coupled to the processor 720, or a combination thereof.

In some aspects, the processing system 710 may be a component of the UE 120 and may include the memory 282 and/or at least one of the TX MIMO processor 266, the receive (RX) processor 258, and/or the controller/processor 280. In some aspects, the apparatus 705 for wireless communication includes means for receiving an intra slot antenna diversity mode configuration corresponding to an intra slot antenna diversity scheme for uplink transmissions, means for transmitting an uplink communication based at least in part on the intra slot antenna diversity scheme, wherein transmitting the uplink communication comprises transmitting a first portion of the uplink communication in a first part of a slot using a first subset of antennas of a set of antennas associated with the UE and transmitting a second portion of the uplink communication in a second part of the slot using a second subset of antennas of the set of antennas, means for receiving at least one configuration communication that includes the intra slot antenna diversity mode configuration, means for transmitting an intra slot antenna diversity mode recommendation, means for transmitting an uplink control information transmission comprising a dedicated bit that indicates the intra slot antenna diversity mode recommendation, means for transmitting a channel state feedback transmission comprising a dedicated bit that indicates the intra slot antenna diversity mode recommendation, means for transmitting an intra slot antenna diversity mode recommendation report that includes an indication of the intra slot antenna diversity mode recommendation, means for receiving at least one downlink signal, means for retransmitting, based at least in part on the frequency first mapping operation, one or more code block groups associated with one of the first subset and the second subset having a signal level that is lower than a signal level of the other of the first subset and the second subset, and means for transmitting at least one demodulation reference signal based at least in part on a frequency hopping operation indicated by the intra slot antenna diversity mode configuration. The aforementioned means may be one or more of the aforementioned components of the apparatus 600 and/or the processing system 710 of the apparatus 705 configured to perform the functions recited by the aforementioned means. As described elsewhere herein, the processing system 710 may include the TX MIMO processor 266, the RX processor 258, and/or the controller/processor 280. In one configuration, the aforementioned means may be the TX MIMO processor 266, the RX processor 258, and/or the controller/processor 280 configured to perform the functions and/or operations recited herein.

FIG. 7 is provided as an example. Other examples may differ from what is described in connection with FIG. 7.

Figure 8:
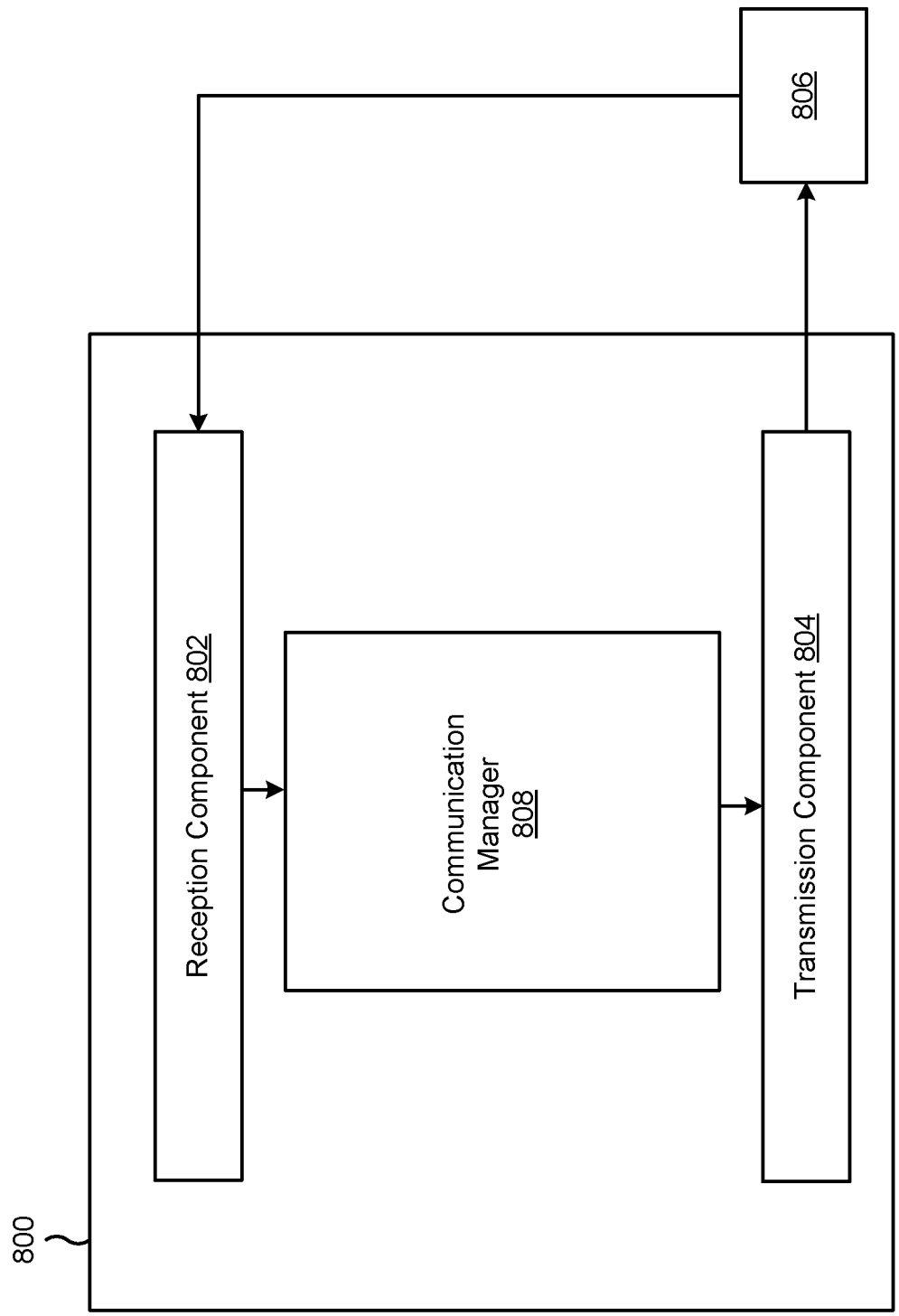
FIG. 8 is a diagram of an example apparatus for wireless communication.

FIG. 8 is a diagram of an example apparatus 800 for wireless communication. The apparatus 800 may be a base station, or a base station may include the apparatus 800. In some aspects, the apparatus 800 includes a reception component 802 and a transmission component 804, which may be in communication with one another (for example, via one or more buses and/or one or more other components). As shown, the apparatus 800 may communicate with another apparatus 806 (such as a UE, a base station, or another wireless communication device) using the reception component 802 and the transmission component 804. As further shown, the apparatus 800 may include the communication manager 808.

In some aspects, the apparatus 800 may be configured to perform one or more operations described herein in connection with FIG. 3. Additionally, or alternatively, the apparatus 800 may be configured to perform one or more methods described herein, such as method 500 of FIG. 5. In some aspects, the apparatus 800 and/or one or more components shown in FIG. 8 may include one or more components of the base station described in connection with FIG. 2. Additionally, or alternatively, one or more components shown in FIG. 8 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 802 may receive communications, such as reference signals, control information, data communications, or a combination thereof, from the apparatus 806. The reception component 802 may provide received communications to one or more other components of the apparatus 800. In some aspects, the reception component 802 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 800. In some aspects, the reception component 802 may include one or more antennas, a modem, a demodulator, a MIMO detector, a receive processor, a controller/processor, a memory, or a combination thereof, of the base station described in connection with FIG. 2.

The transmission component 804 may transmit communications, such as reference signals, control information, data communications, or a combination thereof, to the apparatus 806. In some aspects, one or more other components of the apparatus 800 may generate communications and may provide the generated communications to the transmission component 804 for transmission to the apparatus 806. In some aspects, the transmission component 804 may perform signal processing on the generated communications (such as filtering, amplification, modulation, digital-to-analog conversion, multiplexing, interleaving, mapping, or encoding, among other examples), and may transmit the processed signals to the apparatus 806. In some aspects, the transmission component 804 may include one or more antennas, a modem, a modulator, a transmit MIMO processor, a transmit processor, a controller/processor, a memory, or a combination thereof, of the base station described in connection with FIG. 2. In some aspects, the transmission component 804 may be co-located with the reception component 802 in a transceiver.

The communication manager 808 and/or the transmission component 804 may transmit, to a UE, an intra slot antenna diversity mode configuration corresponding to an intra slot antenna diversity scheme for uplink transmissions. In some aspects, the communication manager 808 may be, or be similar to, the communication manager 150 depicted in FIGS. 1 and 2. In some aspects, the communication manager 808 may include one or more antennas, a modem, a controller/processor, a memory, or a combination thereof, of the UE described in connection with FIG. 2. In some aspects, the communication manager 808 may include the reception component 802 and/or the transmission component 804.

The communication manager 808 and/or reception component 802 may receive, from the UE, an uplink communication based at least in part on the intra slot antenna diversity scheme, wherein receiving the uplink communication comprises receiving a first portion of the uplink communication in a first part of a slot using a first subset of antennas of a set of antennas associated with the UE and receiving a second portion of the uplink communication in a second part of the slot using a second subset of antennas of the set of antennas.

The communication manager 808 and/or reception component 802 may receive an intra slot antenna diversity mode recommendation, wherein transmitting the intra slot antenna diversity mode configuration comprises transmitting the intra slot antenna diversity mode configuration based at least in part on the intra slot antenna diversity mode recommendation. The communication manager 808 and/or transmission component 804 may transmit at least one downlink signal, wherein the one or more antenna imbalance parameters correspond to the at least one downlink signal.

The communication manager 808 and/or reception component 802 may receive, based at least in part on the frequency first mapping operation, a retransmission of one or more code block groups associated with one of the first subset and the second subset having a signal level that is lower than a signal level of the other of the first subset and the second subset. The communication manager 808 and/or reception component 802 may receive at least one demodulation reference signal based at least in part on a frequency hopping operation indicated by the intra slot antenna diversity mode configuration. The communication manager 808 and/or reception component 802 may receive at least one uplink signal, wherein transmitting the intra slot antenna diversity mode configuration comprises transmitting the intra slot antenna diversity mode configuration based at least in part on one or more parameters associated with the at least one uplink signal.

The number and arrangement of components shown in FIG. 8 are provided as an example. In practice, there may be additional components, fewer components, different components, or differently arranged components than those shown in FIG. 8. Furthermore, two or more components shown in FIG. 8 may be implemented within a single component, or a single component shown in FIG. 8 may be implemented as multiple, distributed components. Additionally, or alternatively, a set of (one or more) components shown in FIG. 8 may perform one or more functions described as being performed by another set of components shown in FIG. 8.

Figure 9:
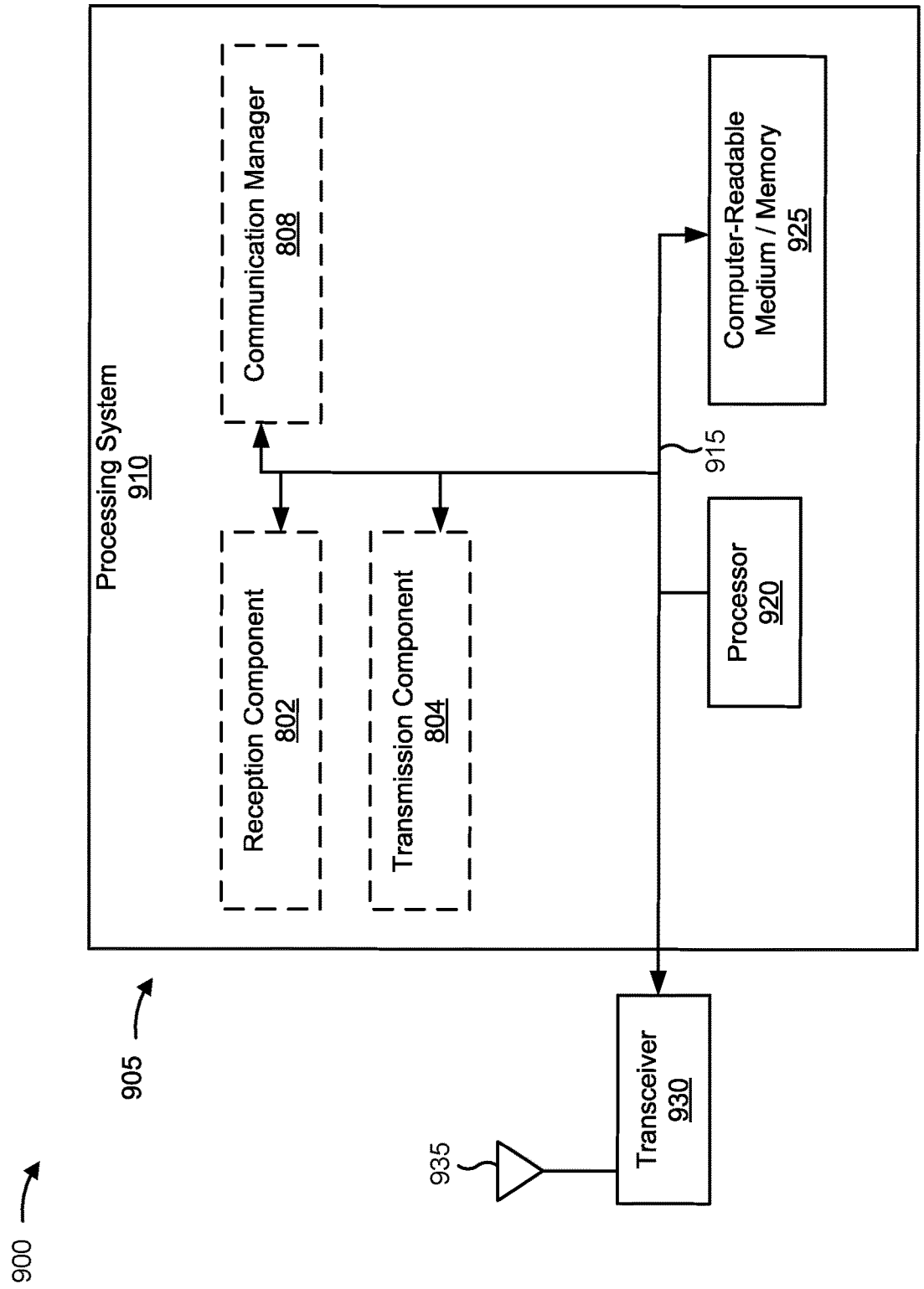
FIG. 9 is a diagram illustrating an example of a hardware implementation for an apparatus employing a processing system.

FIG. 9 is a diagram illustrating an example 900 of a hardware implementation for an apparatus 905 employing a processing system 910. The apparatus 905 may be a base station.

The processing system 910 may be implemented with a bus architecture, represented generally by the bus 915. The bus 915 may include any number of interconnecting buses and bridges depending on the specific application of the processing system 910 and the overall design constraints. The bus 915 links together various circuits including one or more processors and/or hardware components, represented by the processor 920, the illustrated components, and the computer-readable medium/memory 925. The bus 915 may also link various other circuits, such as timing sources, peripherals, voltage regulators, and/or power management circuits.

The processing system 910 may be coupled to a transceiver 930. The transceiver 930 is coupled to one or more antennas 935. The transceiver 930 provides a means for communicating with various other apparatuses over a transmission medium. The transceiver 930 receives a signal from the one or more antennas 935, extracts information from the received signal, and provides the extracted information to the processing system 910, specifically the reception component 802. In addition, the transceiver 930 receives information from the processing system 910, specifically the transmission component 804, and generates a signal to be applied to the one or more antennas 935 based at least in part on the received information.

The processing system 910 includes a processor 920 coupled to a computer-readable medium/memory 925. The processor 920 is responsible for general processing, including the execution of software stored on the computer-readable medium/memory 925. The software, when executed by the processor 920, causes the processing system 910 to perform the various functions described herein for any particular apparatus. The computer-readable medium/memory 925 may also be used for storing data that is manipulated by the processor 920 when executing software. The processing system further includes at least one of the illustrated components. The components may be software modules running in the processor 920, resident/stored in the computer-readable medium/memory 925, one or more hardware modules coupled to the processor 920, or a combination thereof.

In some aspects, the processing system 910 may be a component of the base station 110 and may include the memory 242 and/or at least one of the TX MIMO processor 230, the RX processor 238, and/or the controller/processor 240. In some aspects, the apparatus 905 for wireless communication includes means for transmitting, to a UE, an intra slot antenna diversity mode configuration corresponding to an intra slot antenna diversity scheme for uplink transmissions, means for receiving, from the UE, an uplink communication based at least in part on the intra slot antenna diversity scheme, wherein receiving the uplink communication comprises receiving a first portion of the uplink communication in a first part of a slot using a first subset of antennas of a set of antennas associated with the UE and receiving a second portion of the uplink communication in a second part of the slot using a second subset of antennas of the set of antennas, means for transmitting at least one configuration communication that includes the intra slot antenna diversity mode configuration, means for receiving an intra slot antenna diversity mode recommendation, means for receiving an uplink control information transmission comprising a dedicated bit that indicates the intra slot antenna diversity mode recommendation, means for receiving a channel state feedback transmission comprising a dedicated bit that indicates the intra slot antenna diversity mode recommendation, means for receiving an intra slot antenna diversity mode recommendation report that includes an indication of the intra slot antenna diversity mode recommendation, means for transmitting at least one downlink signal, means for receiving, based at least in part on the frequency first mapping operation, a retransmission of one or more code block groups associated with one of the first subset and the second subset having a signal level that is lower than a signal level of the other of the first subset and the second subset, means for receiving at least one demodulation reference signal based at least in part on a frequency hopping operation indicated by the intra slot antenna diversity mode configuration, means for receiving at least one uplink signal, means for transmitting the intra slot antenna diversity mode configuration based at least in part on a failure to determine an antenna imbalance parameter associated with the UE, and means for transmitting the intra slot antenna diversity mode configuration based at least in part on a delay time period between a time associated with a last indication of an antenna reselection or a UE downlink measurement and a time associated with a next indication of an antenna reselection or a UE downlink measurement. The aforementioned means may be one or more of the aforementioned components of the apparatus 800 and/or the processing system 910 of the apparatus 905 configured to perform the functions recited by the aforementioned means. As described elsewhere herein, the processing system 910 may include the TX MIMO processor 230, the receive processor 238, and/or the controller/processor 240. In one configuration, the aforementioned means may be the TX MIMO processor 230, the receive processor 238, and/or the controller/processor 240 configured to perform the functions and/or operations recited herein.

FIG. 9 is provided as an example. Other examples may differ from what is described in connection with FIG. 9.

The following provides an overview of some Aspects of the present disclosure:

Aspect 1: A method of wireless communication performed by a user equipment (UE), comprising: receiving an intra slot antenna diversity mode configuration corresponding to an intra slot antenna diversity scheme for uplink transmissions; and transmitting an uplink communication based at least in part on the intra slot antenna diversity scheme, wherein transmitting the uplink communication comprises transmitting a first portion of the uplink communication in a first part of a slot using a first subset of antennas of a set of antennas associated with the UE and transmitting a second portion of the uplink communication in a second part of the slot using a second subset of antennas of the set of antennas.

Aspect 2: The method of Aspect 1, wherein receiving the intra slot antenna diversity mode configuration comprises receiving at least one configuration communication that includes the intra slot antenna diversity mode configuration, the at least one configuration communication comprising at least one of a downlink control information transmission or a medium access control element.

Aspect 3: The method of Aspect 2, wherein the downlink control information transmission includes a dedicated information element field carrying a value that indicates the intra slot antenna diversity mode configuration.

Aspect 4: The method of any of Aspects 1-3, further comprising transmitting an intra slot antenna diversity mode recommendation, wherein receiving the intra slot antenna diversity mode configuration comprises receiving the intra slot antenna diversity mode configuration based at least in part on the intra slot antenna diversity mode recommendation.

Aspect 5: The method of Aspect 4, wherein transmitting the intra slot antenna diversity mode recommendation comprises transmitting an uplink control information transmission comprising a dedicated bit that indicates the intra slot antenna diversity mode recommendation.

Aspect 6: The method of Aspect 4, wherein transmitting the intra slot antenna diversity mode recommendation comprises transmitting a channel state feedback transmission comprising a dedicated bit that indicates the intra slot antenna diversity mode recommendation.

Aspect 7: The method of Aspect 4, wherein transmitting the intra slot antenna diversity mode recommendation comprises transmitting an intra slot antenna diversity mode recommendation report that includes an indication of the intra slot antenna diversity mode recommendation.

Aspect 8: The method of Aspect 7, wherein the intra slot antenna diversity mode recommendation report indicates one or more antenna imbalance parameters associated with the set of antennas.

Aspect 9: The method of Aspect 8, further comprising receiving at least one downlink signal, wherein the one or more antenna imbalance parameters correspond to the at least one downlink signal.

Aspect 10: The method of Aspect 9, wherein the at least one downlink signal comprises at least one reference signal.

Aspect 11: The method of any of Aspects 4-10, wherein the intra slot antenna diversity mode recommendation is based at least in part on at least one of: one or more antenna imbalance parameters, an antenna switch diversity scheme based antenna reselection rate, a signal to noise ratio associated with a current channel, or a modulation and coding scheme associated with the current channel.

Aspect 12: The method of Aspect 11, wherein the intra slot antenna diversity mode recommendation is further based at least in part on at least one recommendation condition being satisfied, wherein the at least one recommendation condition is satisfied based at least in part on at least one of: a frequency of reselection of at least one subset of antennas, having an associated imbalance level that is lower than an imbalance level associated with one or more other subsets of antennas of the set of antennas, satisfying a frequency threshold, a relative difference between a value of an antenna parameter associated with a first reselected subset of antennas and a value of the antenna parameter associated with a first reselected subset of antennas satisfying a difference threshold, the signal to noise ratio failing to satisfy a signal to noise ratio threshold, or the modulation and coding scheme failing to satisfy a modulation and coding scheme threshold.

Aspect 13: The method of any of Aspects 1-12, wherein the first subset of antennas and the second subset of antennas are mutually exclusive.

Aspect 14: The method of any of Aspects 1-13, wherein a relative antenna imbalance level associated with at least one of the first subset of antennas or the second subset of antennas is less than at least one additional relative imbalance level associated with at least one additional subset of antennas of the set of antennas.

Aspect 15: The method of any of Aspects 1-14, wherein the uplink communication is based at least in part on a frequency first mapping operation.

Aspect 16: The method of Aspect 15, wherein the intra slot antenna diversity scheme applies antenna diversity at a transport block level based at least in part on the frequency first mapping operation.

Aspect 17: The method of either of Aspects 15 or 16, wherein the intra slot antenna diversity mode configuration is associated with a frequency hopping mode configuration based at least in part on the frequency first mapping operation.

Aspect 18: The method of any of Aspects 15-17, further comprising retransmitting, based at least in part on the frequency first mapping operation, one or more code block groups associated with one of the first subset and the second subset having a signal level that is lower than a signal level of the other of the first subset and the second subset.

Aspect 19: The method of any of Aspects 1-14, wherein the uplink communication is based at least in part on a time first mapping operation.

Aspect 20: The method of Aspect 19, wherein the intra slot antenna diversity scheme applies antenna diversity at a code block level based at least in part on the time first mapping operation.

Aspect 21: The method of either of Aspects 19 or 20, wherein the intra slot antenna diversity mode configuration is not associated with a frequency hopping mode configuration based at least in part on the time first mapping operation.

Aspect 22: The method of any of Aspects 1-21, wherein the uplink communication comprises a cyclic prefix orthogonal frequency division multiplexing waveform or a discrete Fourier transform spread orthogonal frequency division multiplexing waveform.

Aspect 23: The method of any of Aspects 1-22, further comprising transmitting at least one demodulation reference signal based at least in part on a frequency hopping operation indicated by the intra slot antenna diversity mode configuration.

Aspect 24: A method of wireless communication performed by a base station, comprising: transmitting, to a user equipment (UE), an intra slot antenna diversity mode configuration corresponding to an intra slot antenna diversity scheme for uplink transmissions; and receiving, from the UE, an uplink communication based at least in part on the intra slot antenna diversity scheme, wherein receiving the uplink communication comprises receiving a first portion of the uplink communication in a first part of a slot using a first subset of antennas of a set of antennas associated with the UE and receiving a second portion of the uplink communication in a second part of the slot using a second subset of antennas of the set of antennas.

Aspect 25: The method of Aspect 24, wherein transmitting the intra slot antenna diversity mode configuration comprises transmitting at least one configuration communication that includes the intra slot antenna diversity mode configuration, the at least one configuration communication comprising at least one of a downlink control information transmission or a medium access control element.

Aspect 26: The method of Aspect 25, wherein the downlink control information transmission includes a dedicated information element field carrying a value that indicates the intra slot antenna diversity mode configuration.

Aspect 27: The method of any of Aspects 24-26, further comprising receiving an intra slot antenna diversity mode recommendation, wherein transmitting the intra slot antenna diversity mode configuration comprises transmitting the intra slot antenna diversity mode configuration based at least in part on the intra slot antenna diversity mode recommendation.

Aspect 28: The method of Aspect 27, wherein receiving the intra slot antenna diversity mode recommendation comprises receiving an uplink control information transmission comprising a dedicated bit that indicates the intra slot antenna diversity mode recommendation.

Aspect 29: The method of Aspect 27, wherein receiving the intra slot antenna diversity mode recommendation comprises receiving a channel state feedback transmission comprising a dedicated bit that indicates the intra slot antenna diversity mode recommendation.

Aspect 30: The method of Aspect 27, wherein receiving the intra slot antenna diversity mode recommendation comprises receiving an intra slot antenna diversity mode recommendation report that includes an indication of the intra slot antenna diversity mode recommendation.

Aspect 31: The method of Aspect 30, wherein the intra slot antenna diversity mode recommendation report indicates one or more antenna imbalance parameters associated with the set of antennas.

Aspect 32: The method of Aspect 31, further comprising transmitting at least one downlink signal, wherein the one or more antenna imbalance parameters correspond to the at least one downlink signal.

Aspect 33: The method of Aspect 32, wherein the at least one downlink signal comprises at least one reference signal.

Aspect 34: The method of any of Aspects 27-33, wherein the intra slot antenna diversity mode recommendation is based at least in part on at least one of: one or more antenna imbalance parameters, an antenna switch diversity scheme based antenna reselection rate, a signal to noise ratio associated with a current channel, or a modulation and coding scheme associated with the current channel.

Aspect 35: The method of Aspect 34, wherein the intra slot antenna diversity mode recommendation is further based at least in part on at least one recommendation condition being satisfied, wherein the at least one recommendation condition is satisfied based at least in part on at least one of: a frequency of reselection of at least one subset of antennas, having an associated imbalance level that is lower than an imbalance level associated with one or more other subsets of antennas of the set of antennas, satisfying a frequency threshold, a relative difference between a value of an antenna parameter associated with a first reselected subset of antennas and a value of the antenna parameter associated with a first reselected subset of antennas satisfying a difference threshold, the signal to noise ratio failing to satisfy a signal to noise ratio threshold, or the modulation and coding scheme failing to satisfy a modulation and coding scheme threshold.

Aspect 36: The method of any of Aspects 24-35, wherein the first subset of antennas and the second subset of antennas are mutually exclusive.

Aspect 37: The method of any of Aspects 24-36, wherein a relative antenna imbalance level associated with at least one of the first subset of antennas or the second subset of antennas is less than at least one additional relative imbalance level associated with at least one additional subset of antennas of the set of antennas.

Aspect 38: The method of any of Aspects 24-37, wherein the uplink communication is based at least in part on a frequency first mapping operation.

Aspect 39: The method of Aspect 38, wherein the intra slot antenna diversity scheme applies antenna diversity at a transport block level based at least in part on the frequency first mapping operation.

Aspect 40: The method of either of Aspects 38 or 39, wherein the intra slot antenna diversity mode configuration is associated with a frequency hopping mode configuration based at least in part on the frequency first mapping operation.

Aspect 41: The method of any of Aspects 38-40, further comprising receiving, based at least in part on the frequency first mapping operation, a retransmission of one or more code block groups associated with one of the first subset and the second subset having a signal level that is lower than a signal level of the other of the first subset and the second subset.

Aspect 42: The method of any of Aspects 24-37, wherein the uplink communication is based at least in part on a time first mapping operation.

Aspect 43: The method of Aspect 42, wherein the intra slot antenna diversity scheme applies antenna diversity at a code block level based at least in part on the time first mapping operation.

Aspect 44: The method of either of Aspects 42 or 43, wherein the intra slot antenna diversity mode configuration is not associated with a frequency hopping mode configuration based at least in part on the time first mapping operation.

Aspect 45: The method of any of Aspects 24-44, wherein the uplink communication comprises a cyclic prefix orthogonal frequency division multiplexing waveform or a discrete Fourier transform spread orthogonal frequency division multiplexing waveform.

Aspect 46: The method of any of Aspects 24-45, further comprising receiving at least one demodulation reference signal based at least in part on a frequency hopping operation indicated by the intra slot antenna diversity mode configuration.

Aspect 47: The method of any of Aspects 24-46, further comprising receiving at least one uplink signal, wherein transmitting the intra slot antenna diversity mode configuration comprises transmitting the intra slot antenna diversity mode configuration based at least in part on one or more parameters associated with the at least one uplink signal.

Aspect 48: The method of Aspect 47, wherein the at least one uplink signal comprises at least one reference signal.

Aspect 49: The method of Aspect 48, wherein the at least one reference signal comprises at least one sounding reference signal.

Aspect 50: The method of Aspect 49, wherein the least one sounding reference signal comprises an antenna switching sounding reference signal.

Aspect 51: The method of any of Aspects 47-50, wherein the one or more parameters indicate a frequency of antenna reselection between different sounding reference signal sessions that satisfies an antenna reselection threshold, and wherein the one or more parameters indicate a reference signal received power difference between the different sounding reference signal sessions that satisfies a reference signal received power difference threshold.

Aspect 52: The method of any of Aspects 47-51, wherein the one or more parameters indicate a frequency of variation of values of reference signal received power associated with a plurality of sounding reference signal ports associated with a plurality of sounding reference signal resources that satisfies a frequency of variation threshold, wherein the one or more parameters indicate a reference signal received power difference between two or more of the plurality of sounding reference signal ports that satisfies a reference signal received power difference threshold.

Aspect 53: The method of Aspect 52, wherein the plurality of sounding reference signal ports corresponds to a codebook-based sounding reference signal configuration.

Aspect 54: The method of any of Aspects 47-53, wherein the one or more parameters indicate at least one of a signal parameter, a channel power level, a channel stability level, a dynamic uplink antenna blockage, an instable antenna switch diversity scheme reselection decision, or an instable antenna switch diversity scheme reselection measurement.

Aspect 55: The method of any of Aspects 47-54, wherein the one or more parameters are associated with at least one of the first subset of antennas or the second subset of antennas.

Aspect 56: The method of any of Aspects 24-55, the intra slot antenna diversity mode configuration comprises transmitting the intra slot antenna diversity mode configuration based at least in part on a failure to determine an antenna imbalance parameter associated with the UE.

Aspect 57: The method of any of Aspects 24-56, the intra slot antenna diversity mode configuration comprises transmitting the intra slot antenna diversity mode configuration based at least in part on a delay time period between a time associated with a last indication of an antenna reselection or a UE downlink measurement and a time associated with a next indication of an antenna reselection or a UE downlink measurement.

Aspect 58: An apparatus for wireless communication at a device, comprising a processor; memory coupled with the processor; and instructions stored in the memory and executable by the processor to cause the apparatus to perform the method of one or more of Aspects 1-23.

Aspect 59: A device for wireless communication, comprising a memory and one or more processors coupled to the memory, the one or more processors configured to perform the method of one or more of Aspects 1-23.

Aspect 60: An apparatus for wireless communication, comprising at least one means for performing the method of one or more of Aspects 1-23.

Aspect 61: A non-transitory computer-readable medium storing code for wireless communication, the code comprising instructions executable by a processor to perform the method of one or more of Aspects 1-23.

Aspect 62: A non-transitory computer-readable medium storing a set of instructions for wireless communication, the set of instructions comprising one or more instructions that, when executed by one or more processors of a device, cause the device to perform the method of one or more of Aspects 1-23.

Aspect 63: An apparatus for wireless communication at a device, comprising a processor; memory coupled with the processor; and instructions stored in the memory and executable by the processor to cause the apparatus to perform the method of one or more of Aspects 24-57.

Aspect 64: A device for wireless communication, comprising a memory and one or more processors coupled to the memory, the one or more processors configured to perform the method of one or more of Aspects 24-57.

Aspect 65: An apparatus for wireless communication, comprising at least one means for performing the method of one or more of Aspects 24-57.

Aspect 66: A non-transitory computer-readable medium storing code for wireless communication, the code comprising instructions executable by a processor to perform the method of one or more of Aspects 24-57.

Aspect 67: A non-transitory computer-readable medium storing a set of instructions for wireless communication, the set of instructions comprising one or more instructions that, when executed by one or more processors of a device, cause the device to perform the method of one or more of Aspects 24-57.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:
   a memory; and
   one or more processors, coupled to the memory, configured to:
   receive an intra slot antenna diversity mode configuration corresponding to an intra slot antenna diversity scheme for uplink transmissions; and
   transmit an uplink communication based at least in part on the intra slot antenna diversity scheme, wherein transmitting the uplink communication comprises transmitting a first portion of the uplink communication in a first part of a slot using a first subset of antennas of a set of antennas associated with the UE and transmitting a second portion of the uplink communication in a second part of the slot using a second subset of antennas of the set of antennas, the first part of the slot being before a switch point in the slot and the second part of the slot being after the switch point in the slot.

2. The UE of claim 1, wherein the one or more processors are further configured to transmit an intra slot antenna diversity mode recommendation, wherein the one or more processors, to receive the intra slot antenna diversity mode configuration, are configured to receive the intra slot antenna diversity mode configuration based at least in part on the intra slot antenna diversity mode recommendation.

3. The UE of claim 2, wherein the one or more processors, to transmit the intra slot antenna diversity mode recommendation, are configured to:

transmit an uplink control information transmission comprising a dedicated bit that indicates the intra slot antenna diversity mode recommendation;
transmit a channel state feedback transmission comprising a dedicated bit that indicates the intra slot antenna diversity mode recommendation; or
transmit an intra slot antenna diversity mode recommendation report that includes an indication of the intra slot antenna diversity mode recommendation.

4. The UE of claim 3, wherein the intra slot antenna diversity mode recommendation report indicates one or more antenna imbalance parameters associated with the set of antennas.

5. The UE of claim 4, wherein the one or more processors are further configured to receive at least one downlink signal, wherein the one or more antenna imbalance parameters correspond to the at least one downlink signal.

6. The UE of claim 2, wherein the intra slot antenna diversity mode recommendation is based at least in part on at least one of:
one or more antenna imbalance parameters,
an antenna switch diversity scheme based antenna reselection rate,
a signal to noise ratio associated with a current channel, or
a modulation and coding scheme associated with the current channel.

7. The UE of claim 6, wherein the intra slot antenna diversity mode recommendation is further based at least in part on at least one recommendation condition being satisfied, wherein the at least one recommendation condition is satisfied based at least in part on at least one of:
a frequency of reselection of at least one subset of antennas, having an associated imbalance level that is lower than an imbalance level associated with one or more other subsets of antennas of the set of antennas, satisfying a frequency threshold,
a relative difference between a value of an antenna parameter associated with a first reselected subset of antennas and a value of the antenna parameter associated with a first reselected subset of antennas satisfying a difference threshold,
the signal to noise ratio failing to satisfy a signal to noise ratio threshold, or
the modulation and coding scheme failing to satisfy a modulation and coding scheme threshold.

8. The UE of claim 1, wherein the first subset of antennas and the second subset of antennas are mutually exclusive.

9. The UE of claim 1, wherein a relative antenna imbalance level associated with at least one of the first subset of antennas or the second subset of antennas is less than at least one additional relative imbalance level associated with at least one additional subset of antennas of the set of antennas.

10. The UE of claim 1, wherein the uplink communication is based at least in part on a frequency first mapping operation.

11. The UE of claim 10, wherein the intra slot antenna diversity scheme applies antenna diversity at a transport block level based at least in part on the frequency first mapping operation.

12. The UE of claim 10, wherein the intra slot antenna diversity mode configuration is associated with a frequency hopping mode configuration based at least in part on the frequency first mapping operation.

13. The UE of claim 10, wherein the one or more processors are further configured to retransmit, based at least in part on the frequency first mapping operation, one or more code block groups associated with one of the first subset and the second subset having a signal level that is lower than a signal level of the other of the first subset and the second subset.

14. The UE of claim 1, wherein the uplink communication is based at least in part on a time first mapping operation.

15. The UE of claim 14, wherein the intra slot antenna diversity scheme applies antenna diversity at a code block level based at least in part on the time first mapping operation.

16. The UE of claim 14, wherein the intra slot antenna diversity mode configuration is not associated with a frequency hopping mode configuration based at least in part on the time first mapping operation.

17. The UE of claim 1, wherein the one or more processors are further configured to transmit at least one demodulation reference signal based at least in part on a frequency hopping operation indicated by the intra slot antenna diversity mode configuration.

18. A network entity for wireless communication, comprising:
a memory; and
one or more processors, coupled to the memory, configured to:
transmit, to a user equipment (UE), an intra slot antenna diversity mode configuration corresponding to an intra slot antenna diversity scheme for uplink transmissions; and
receive, from the UE, an uplink communication based at least in part on the intra slot antenna diversity scheme, wherein receiving the uplink communication comprises receiving a first portion of the uplink communication in a first part of a slot using a first subset of antennas of a set of antennas associated with the UE and receiving a second portion of the uplink communication in a second part of the slot using a second subset of antennas of the set of antennas, the first part of the slot being before a switch point in the slot and the second part of the slot being after the switch point in the slot.

19. The network entity of claim 18, wherein the one or more processors are further configured to receive an intra slot antenna diversity mode recommendation, wherein the one or more processors, to transmit the intra slot antenna diversity mode configuration, are configured to transmit the intra slot antenna diversity mode configuration based at least in part on the intra slot antenna diversity mode recommendation.

20. The network entity of claim 18, wherein the one or more processors are further configured to receive at least one uplink signal, wherein the one or more processors, to transmit the intra slot antenna diversity mode configuration, are configured to:
transmit the intra slot antenna diversity mode configuration based at least in part on one or more parameters associated with the at least one uplink signal;
transmit the intra slot antenna diversity mode configuration based at least in part on a failure to determine an antenna imbalance parameter associated with the UE; or
transmit the intra slot antenna diversity mode configuration based at least in part on a delay time period between a time associated with a last indication of an antenna reselection or a UE downlink measurement and a time associated with a next indication of an antenna reselection or a UE downlink measurement.

21. The network entity of claim 20, wherein the one or more parameters indicate a frequency of antenna reselection between different sounding reference signal sessions that satisfies an antenna reselection threshold, and wherein the one or more parameters indicate a reference signal received power difference between the different sounding reference signal sessions that satisfies a reference signal received power difference threshold.

22. The network entity of claim 20, wherein the one or more parameters indicate a frequency of variation of values of reference signal received power associated with a plurality of sounding reference signal ports associated with a plurality of sounding reference signal resources that satisfies a frequency of variation threshold, wherein the one or more parameters indicate a reference signal received power difference between two or more of the plurality of sounding reference signal ports that satisfies a reference signal received power difference threshold.

23. A method of wireless communication performed by a user equipment (UE), comprising:
receiving an intra slot antenna diversity mode configuration corresponding to an intra slot antenna diversity scheme for uplink transmissions; and
transmitting an uplink communication based at least in part on the intra slot antenna diversity scheme, wherein transmitting the uplink communication comprises transmitting a first portion of the uplink communication in a first part of a slot using a first subset of antennas of a set of antennas associated with the UE and transmitting a second portion of the uplink communication in a second part of the slot using a second subset of antennas of the set of antennas, the first part of the slot being before a switch point in the slot and the second part of the slot being after the switch point in the slot.

24. The method of claim 23, further comprising transmitting an intra slot antenna diversity mode recommendation, wherein receiving the intra slot antenna diversity mode configuration comprises receiving the intra slot antenna diversity mode configuration based at least in part on the intra slot antenna diversity mode recommendation.

25. The method of claim 23, wherein the uplink communication is based at least in part on a frequency first mapping operation.

26. The method of claim 25, wherein the intra slot antenna diversity scheme applies antenna diversity at a transport block level based at least in part on the frequency first mapping operation.

27. The method of claim 23, wherein the uplink communication is based at least in part on a time first mapping operation.

28. A method of wireless communication performed by a network entity, comprising:
transmitting, to a user equipment (UE), an intra slot antenna diversity mode configuration corresponding to an intra slot antenna diversity scheme for uplink transmissions; and
receiving, from the UE, an uplink communication based at least in part on the intra slot antenna diversity scheme, wherein receiving the uplink communication comprises receiving a first portion of the uplink communication in a first part of a slot using a first subset of antennas of a set of antennas associated with the UE and receiving a second portion of the uplink communication in a second part of the slot using a second subset of antennas of the set of antennas, the first part of the slot being before a switch point in the slot and the second part of the slot being after the switch point in the slot.

29. The method of claim 28, further comprising receiving an intra slot antenna diversity mode recommendation, wherein transmitting the intra slot antenna diversity mode configuration comprises transmitting the intra slot antenna diversity mode configuration based at least in part on the intra slot antenna diversity mode recommendation.

30. The method of claim 28, further comprising receiving at least one uplink signal, wherein transmitting the intra slot antenna diversity mode configuration comprises at least one of:
transmitting the intra slot antenna diversity mode configuration based at least in part on one or more parameters associated with the at least one uplink signal;
transmitting the intra slot antenna diversity mode configuration based at least in part on a failure to determine an antenna imbalance parameter associated with the UE; or
transmitting the intra slot antenna diversity mode configuration based at least in part on a delay time period between a time associated with a last indication of an antenna reselection or a UE downlink measurement and a time associated with a next indication of an antenna reselection or a UE downlink measurement.

* * * * *